United States Patent
Yamaguchi et al.

(10) Patent No.: US 6,342,921 B1
(45) Date of Patent: Jan. 29, 2002

(54) LATTICE-TYPE SOLID STATE IMAGE PICKUP DEVICE

(75) Inventors: Masanori Yamaguchi; Tomio Ishigami; Atsushi Kobayashi, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/193,391

(22) Filed: Nov. 18, 1998

Related U.S. Application Data

(62) Division of application No. 08/807,201, filed on Feb. 28, 1997.

(30) Foreign Application Priority Data

| Mar. 11, 1996 | (JP) | ................................. 8-082035 |
| Mar. 16, 1996 | (JP) | ................................. 8-078315 |
| Feb. 14, 1997 | (JP) | ................................. 9-030179 |

(51) Int. Cl.⁷ ................................................ H04N 5/335
(52) U.S. Cl. ........................................................ 348/322
(58) Field of Search ................................ 348/207, 294, 348/311, 312, 315, 318, 319, 248, 241, 320, 321, 322, 323, 324; H04N 5/335

(56) References Cited

U.S. PATENT DOCUMENTS

| 5,070,406 A | 12/1991 | Kinoshita |
| 5,164,831 A | 11/1992 | Kuchta et al. |
| 5,182,648 A | * 1/1993 | Hirota ............................ 348/315 |
| 5,278,661 A | 1/1994 | Wakagi et al. |
| 5,384,596 A | 1/1995 | Kobayashi et al. |
| 5,387,935 A | 2/1995 | Kobayashi |
| 5,396,290 A | 3/1995 | Kanneguldla |
| 5,444,482 A | 8/1995 | Misawa |
| 5,525,957 A | 6/1996 | Tanaka |
| 5,838,372 A | * 11/1998 | Wood ............................ 348/312 |
| 5,896,172 A | * 4/1999 | Korthout et al. ............. 348/248 |
| 5,990,952 A | * 11/1999 | Hamasaki ..................... 348/311 |

FOREIGN PATENT DOCUMENTS

| EP | 0 129 122 A | 12/1984 |
| EP | 0 669 752 A | 8/1995 |
| EP | 0 689 346 A | 12/1995 |
| EP | 0 720 388 A2 | 7/1996 |
| WO | WO 91 14334 A | 9/1991 |

OTHER PUBLICATIONS

Search Report (9700656–3).

* cited by examiner

Primary Examiner—Tuan Ho
(74) Attorney, Agent, or Firm—Frommer Lawrence & Haug LLP; William S. Frommer; Bruno Polito

(57) ABSTRACT

A solid state image pickup device of an interline system. The device includes a plurality of photosensors, which are arranged in a matrix form, which receive light transmitted through a plurality of color filters, and which are repeated in the vertical direction at a period of "N" pixels. A vertical transfer unit is provided for transferring charges read out from the plurality of photosensors. A horizontal transfer unit is coupled to the vertical transfer unit, and is used to horizontally transfer the charges transferred by the vertical transfer unit. Charges are passed to the vertical transfer unit by a first signal supplying unit and a second signal supplying unit. At least one of the signal supplying units is made up of "m" first photosensor groups arranged in the vertical direction and second photosensor groups numbering "a" times as large as the pixel period "N" and which are also arranged in the vertical direction. The first photosensor groups and second photosensor groups are alternately arranged in the vertical direction.

11 Claims, 25 Drawing Sheets

FIRST RECORDING MODE

Fig. 15A  Fig. 15B
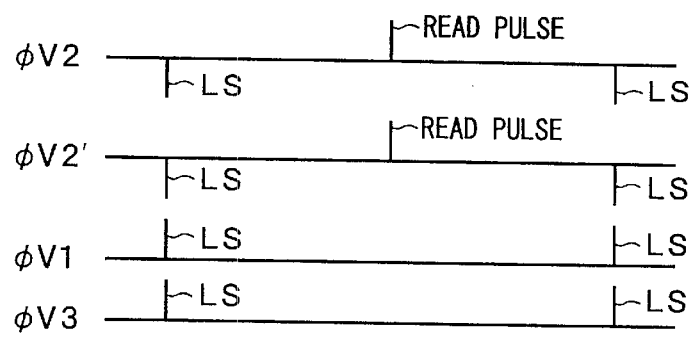
Fig. 16A
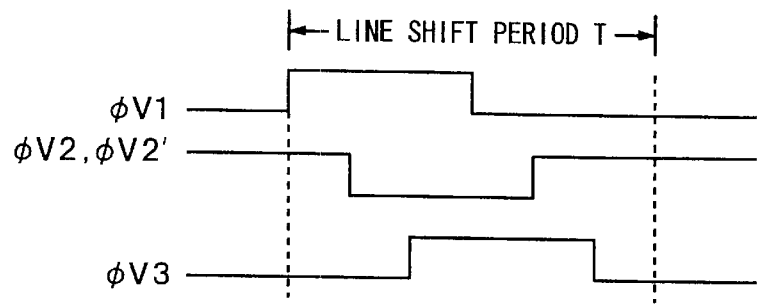
Fig. 16B
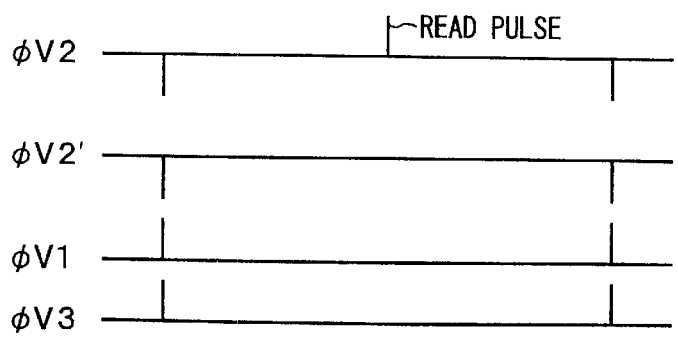
Fig. 16C

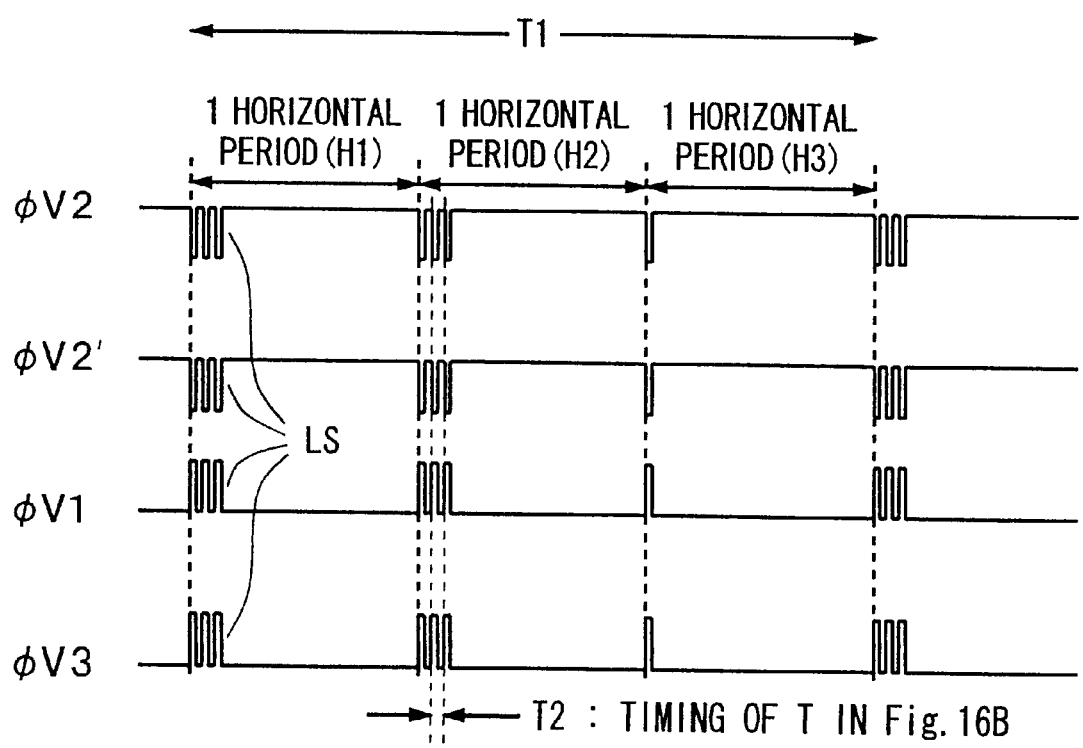

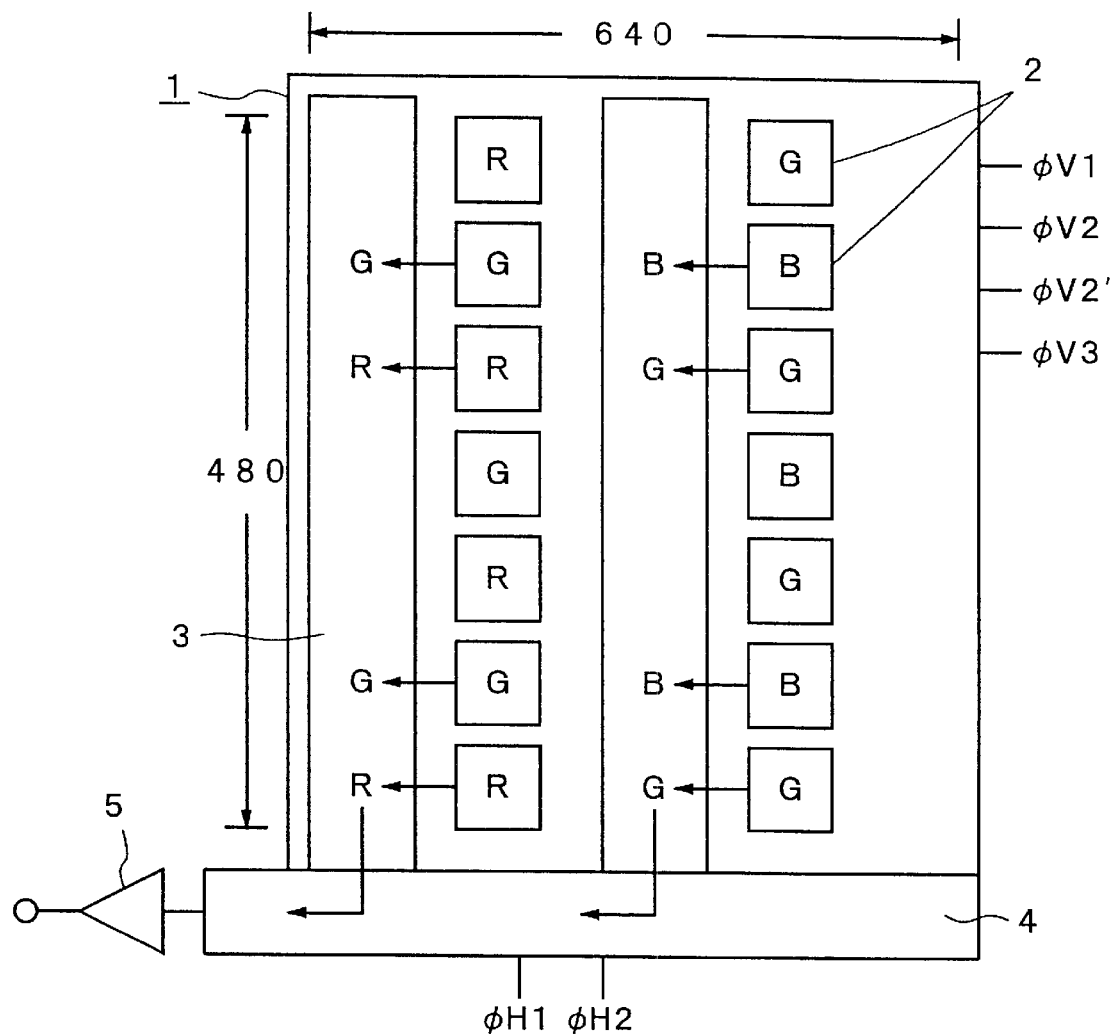

n
n+1
n+2
n+3
n+4

LATTICE-TYPE SOLID STATE IMAGE PICKUP DEVICE

This applcation is a Div. of Ser. No. 08/807,210 filed Feb. 28, 1997.

BACKGROUND OF THE INVENTION

1. Field of the Invention

The invention relates to an electronic still camera and to an image pickup apparatus and a solid state image pickup device which are suitable for use in an electronic still camera.

2. Description of the Related Art

Recently, the electronic still camera is being spread. As a solid state image pickup device, for example, a CCD which is suitable for use in the electronic still camera, a device of a square lattice and a device of a progressive scan have been proposed. According to the square lattice, an interval in the vertical direction of adjacent pixels and an interval in the lateral direction are equalized and it is used to match an image pickup signal with a signal for a monitor for a personal computer. According to a CCD which is used in a conventional video camera or the like, in order to generate an output signal of an interlace type, as shown in FIG. 28, charges are accumulated for 1/60 second (one field), the charges of pixels of upper and lower two adjacent lines are read out, the charges of the two pixels which were read out are mixed in a CCD for vertical transfer, a combination in the vertical direction of the two pixels to be mixed is deviated with respect to an odd field and an even field, thereby realizing an interlace scan.

According to such a CCD, since an accumulating time is equal to 1/60 second, as compared with a frame accumulation type of an accumulating time of 1/30 second, an image pickup of a motion image can be preferably performed but there is a disadvantage such that a vertical resolution is low. Therefore, such a CCD is not suitable as an image pickup device of the electronic still camera. As shown in FIG. 29, therefore, a progressive scan system in which charges are accumulated for 1/30 second and the charges of all pixels are independently read out without mixing has been proposed. According to such a system, although the deterioration in vertical resolution can be prevented, in order to output an image pickup signal from the image pickup device, a time that is twice as long as that of the image pickup device for the video camera mentioned above is needed on the assumption that the number of pixels is the same and a clock for reading out is the same. More specifically speaking, an image pickup signal at a period of 1/30 second is generated.

In case of the electronic still camera, in order to focus at the time of photographing or adjust an angle of the camera upon photographing, a monitor to display a pickup image, for example, a liquid crystal monitor is frequently provided. The liquid crystal monitor usually displays a television image by a non-interlace scan of 1/60 second. Therefore, when the image pickup signal at a period of 1/30 second is supplied as it is to the liquid crystal monitor, an image as shown in FIG. 30 is derived. To avoid such a phenomenon, as shown in FIG. 31, for a liquid crystal monitor 62, it is necessary to convert a frame rate by a VRAM (video RAM) 61 (or frame memory). An image pickup signal at a period of 1/30 second is supplied to the VRAM 61 and a non-interlace signal at a period of 1/60 second is generated as an output.

As mentioned above, the image pickup device of the progressive scan type is suitable as an image pickup device of the electronic still camera with respect to a point that the vertical resolution is high. However, since the frame rate is changed in order to display the image pickup image to an ordinary television monitor, there is a problem such that a VRAM or a frame memory is necessary and the costs rise. Further, since the electronic still camera has automatic control apparatuses such as auto focus control apparatus, automatic iris control apparatus, auto white balance control apparatus, and the like, there occurs a problem such that since a period of an output signal of the image pickup device is long, a response speed of the automatic control is made slow. Further, there is also a problem such that a motion of an image which is displayed on the monitor is not smooth.

As a method of solving the foregoing problems, a data rate of the output signal of the image pickup device is raised. When a clock frequency is high, however, problems such as increase in electric power consumption, increase in costs of parts which are used, deterioration in S/N ratio, and the like occur. Therefore, the method of raising the data rate of the image pickup signal is unpreferable.

OBJECTS AND SUMMARY OF THE INVENTION

It is, therefore, an object of the invention to provide an image pickup apparatus which can output an image pickup signal at a high speed without losing an advantage such that a vertical resolution is high, thereby making a VRAM unnecessary.

Another object of the invention is to provide an image pickup apparatus in which when a pickup image is recorded to a recording medium or when data is read out from the recording medium, a period during which a display of a monitor disappears can be minimized.

Still another object of the invention is to provide a solid state image pickup device which can output an image pickup signal at a high speed.

According to an embodiment of the invention, the above objects are accomplished by an image pickup apparatus comprising:

a solid state image pickup device which can operate in a first image pickup mode for performing a reading operation of pixels of a first number of lines at a first period and a second image pickup mode for performing a reading operation of pixels of a number of lines smaller than the first number of lines at a second period different from the first period;

image signal forming means for forming an image signal from an output signal of the solid state image pickup device;

display means which can display an image signal at a period concerning the second period;

storing means for storing the image signal;

switching means for switching a connecting relation among the image signal forming means, the display means, and the storing means so as to enable a transfer of the image signal between any two of the image signal forming means, the display means, and the storing means; and control means for setting a first recording mode to control so that the solid state image pickup device operates in the first image pickup mode and to control the switching means so as to connect the image signal forming means and the storing means when the image signal is stored into the memory means, and, for immediately shifting to a second recording mode to control so that the solid state image pickup device operates in the second operating mode and to control the switching means so as to connect the image signal forming means and the display means when the image signal is stored into the storing means in the first recording mode.

According to another embodiment of the invention, there is also provided an image pickup apparatus comprising:

a solid state image pickup device which can operate in a first image pickup mode for performing a reading operation of pixels of a first number of lines at a first period and a second image pickup mode for performing a reading operation of pixels of a number of lines smaller than the first number of lines at a second period different from the first period;

image signal forming means for forming an image signal from an output signal of the solid state image pickup device;

storing means for storing the image signal;

a coupling terminal which is connected to display means which can display an image signal at a period concerning the second period;

switching means for switching a connecting relation among the image signal forming means, the coupling terminal, and the storing means so as to enable a transfer of the image signal between any two of the image signal forming means, the coupling terminal, and the storing means; and control means for setting a first recording mode to control so that the solid state image pickup device operates in the first image pickup mode and to control the switching means so as to connect the image signal forming means and the storing means when the image signal is stored into the memory means, and, for immediately shifting to a second recording mode to control so that the solid state image pickup device operates in the second operating mode and to control the switching means so as to connect the image signal forming means and the coupling terminal when the image signal is stored into the storing means in the first recording mode.

According to another embodiment of the invention, there is also provided a solid state image pickup device of an interline system, comprising:

a plurality of photosensors which are arranged in a matrix form and into which the lights transmitted through a plurality of color filters which are repeated in the vertical direction at a period of N (N is a natural number) pixels are inputted;

a vertical transfer unit for transferring charges read out from the plurality of photosensors without mixing charges from the photosensors continuously arranged in the vertical direction;

a horizontal transfer unit, coupled to the vertical transfer unit, for generating the charges transferred from the vertical transfer unit at one horizontal period;

a first signal supplying unit in which one unit is constructed by m (m is a natural number) first photosensor groups which are continuously arranged in the vertical direction and second photosensor groups of the number that is a (a is a natural number) times as large as the pixel period N which are continuously arranged in the vertical direction, the first photosensor groups and the second photosensor groups are alternately arranged in the vertical direction, and which is used for transferring the charges accumulated in the first photosensor groups to the vertical transfer unit; and a second signal supplying unit for transferring the charges accumulated in the second photosensor groups to the vertical transfer unit, wherein the first signal supplying unit and the second signal supplying unit are independently provided.

The above and other objects and features of the present invention will become apparent from the following detailed description and the appended claims with reference to the accompanying drawings.

BRIEF DESCRIPTION OF THE DRAWINGS

FIGS. 15A and 15B are schematic diagrams showing an example and another example of an array of color filters which are used in the example of the image pickup device;

FIGS. 16A to 16C are timing charts for driving pulses to drive the example of the image pickup device;

FIG. 17 is a timing chart for the driving pulses of the image pickup device in FIG. 14;

FIG. 19 is a schematic diagram showing a specific example of the image pickup device;

DETAILED DESCRIPTION OF THE PREFERRED EMBODIMENTS

Figure 1:
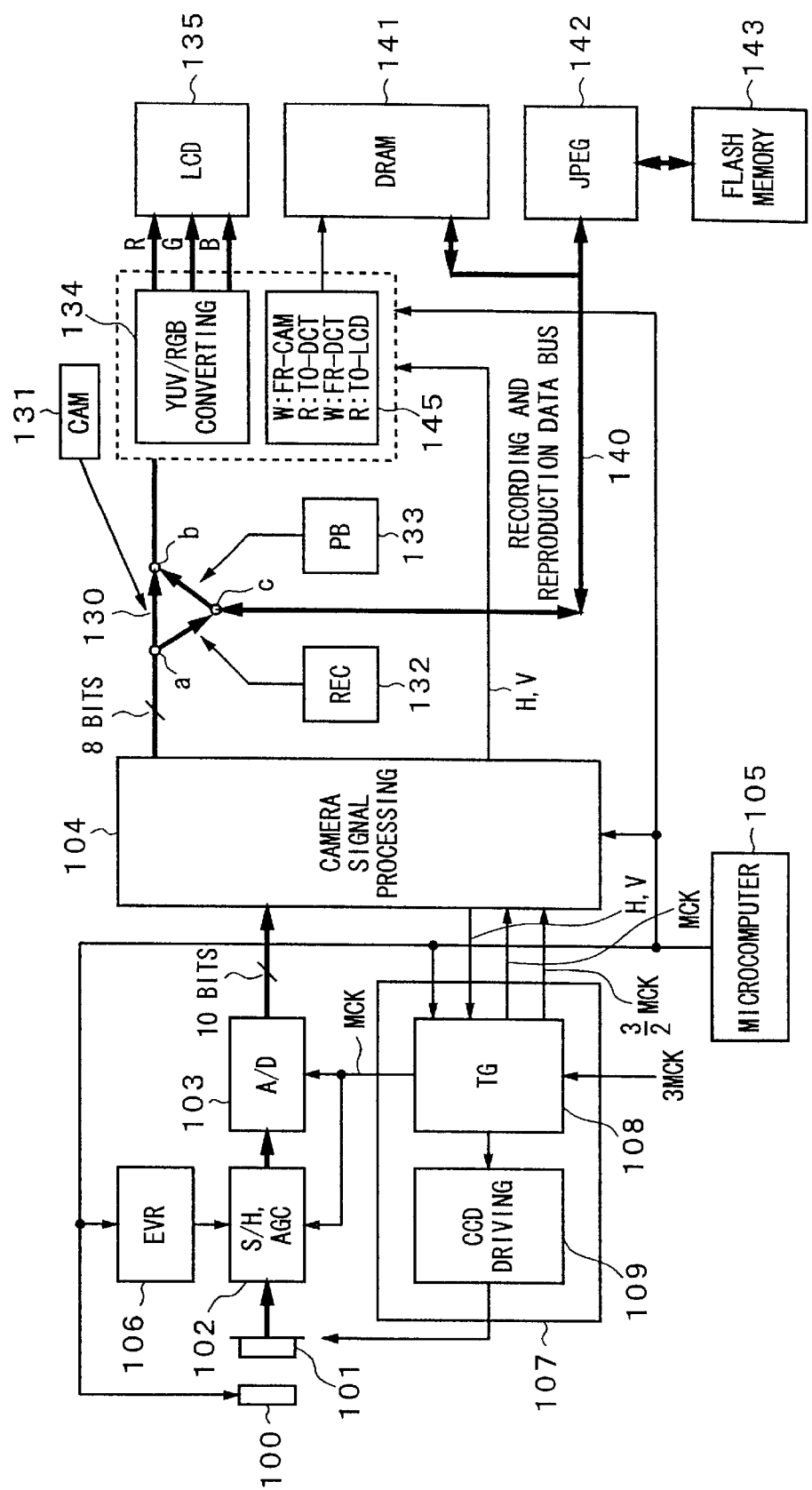
FIG. 1 is a block diagram showing a construction of an embodiment of the invention.

An embodiment of the invention will now be described hereinbelow with reference to the drawings. FIG. 1 shows a whole construction of an embodiment of the invention. Reference numeral 101 denotes a solid state image pickup device such as a CCD. The CCD 101 is an imager of a single plate type having three primary color filters, complementary color filters, or the like. As will be explained in detail hereinlater, the CCD 101 can switch an operating mode (first image pickup mode) of a full-frame reading for reading out charges of all pixels (progressive scan) without mixing them and an operating mode (second image pickup mode) of a line thinning or a line decimation for generating a signal in which the number of lines is reduced. The operating modes are switched by controlling a timing generator 108 by a microcomputer 105. An object light is inputted to the CCD 101 through a lens system 100.

An output signal of the CCD 101 is supplied to a sample hold and AGC circuit (hereinafter, simply referred to as an S/H-AGC circuit) 102. In the full-frame reading mode, a time that is required to read one image is equal to 1/30 second. In the line thinning mode, it is equal to 1/60 second. Sampling and holding processes are realized by a construction of a correlated double sampling circuit and an elimination of noises, a waveform shaping, and a compensation of defective pixels are carried out. An AGC process is performed to control a gain in accordance with a brightness of an object. A gain is also controlled for an automatic aperture control. An output signal of the S/H-AGC circuit 102 is supplied to an A/D converter 103. A digital image pickup signal in which one sample consists of ten bits is generated from the A/D converter 103.

The digital image pickup signal is supplied to a camera signal processing circuit 104 of a construction of an IC circuit. The signal processing circuit 104 includes: a digital clamping circuit; a luminance signal processing circuit; a chrominance signal processing circuit; an outline correcting circuit; a defect compensating circuit; an auto aperture control circuit; an auto focus control circuit; an auto white balance correcting circuit; a multiplexer of a component signal [digital video signal sampled by a sampling frequency of a ratio of 4:1:1 (Y: luminance signal, Cr, Cb: color difference signals)]; a sync signal generating circuit; a timing generator; an interface with the microcomputer; and the like. A more specific construction of the signal processing circuit 104 will be explained hereinlater. The component signal is converted to multiplex data by the multiplexer.

Reference numeral 105 denotes the microcomputer for controlling signal processes. A control signal from the microcomputer 105 is supplied to the lens system 100, an electronic volume 106; the camera signal processing circuit 104; and a timing controller 107. The timing controller 107 is constructed by the timing generator 108 and a CCD driving circuit 109. The electronic volume 106 generates a gain control signal of the S/H-AGC circuit 102.

A clock 3MCK of a frequency that is three times as high as that of a clock MCK is supplied to the timing generator 108 of the timing controller 107. The timing generator 108 forms the clock MCK from the clock 3MCK and supplies to the S/H-AGC circuit 102, A/D converter 103, and camera signal processing circuit 104. The timing generator 108 also forms a clock 3/2 MCK of a frequency that is 3/2 times as high as that of the clock MCK from the clock 3MCK and supplies to the camera signal processing circuit 104.

As an example, the number of horizontal pixels of the CCD 101 is set to 780 and MCK=780 fh (fh: horizontal scan frequency of the CCD 101)=12.3 MHz. A horizontal sync signal H and a vertical sync signal V which are generated from the camera signal processing circuit 104 are supplied to the timing controller 107. Driving pulses generated from the CCD driving circuit 109 of the timing controller 107 are supplied to the CCD 101. The driving pulses include a vertical driving pulse, a horizontal driving pulse, a read pulse, and the like.

Figure 2:
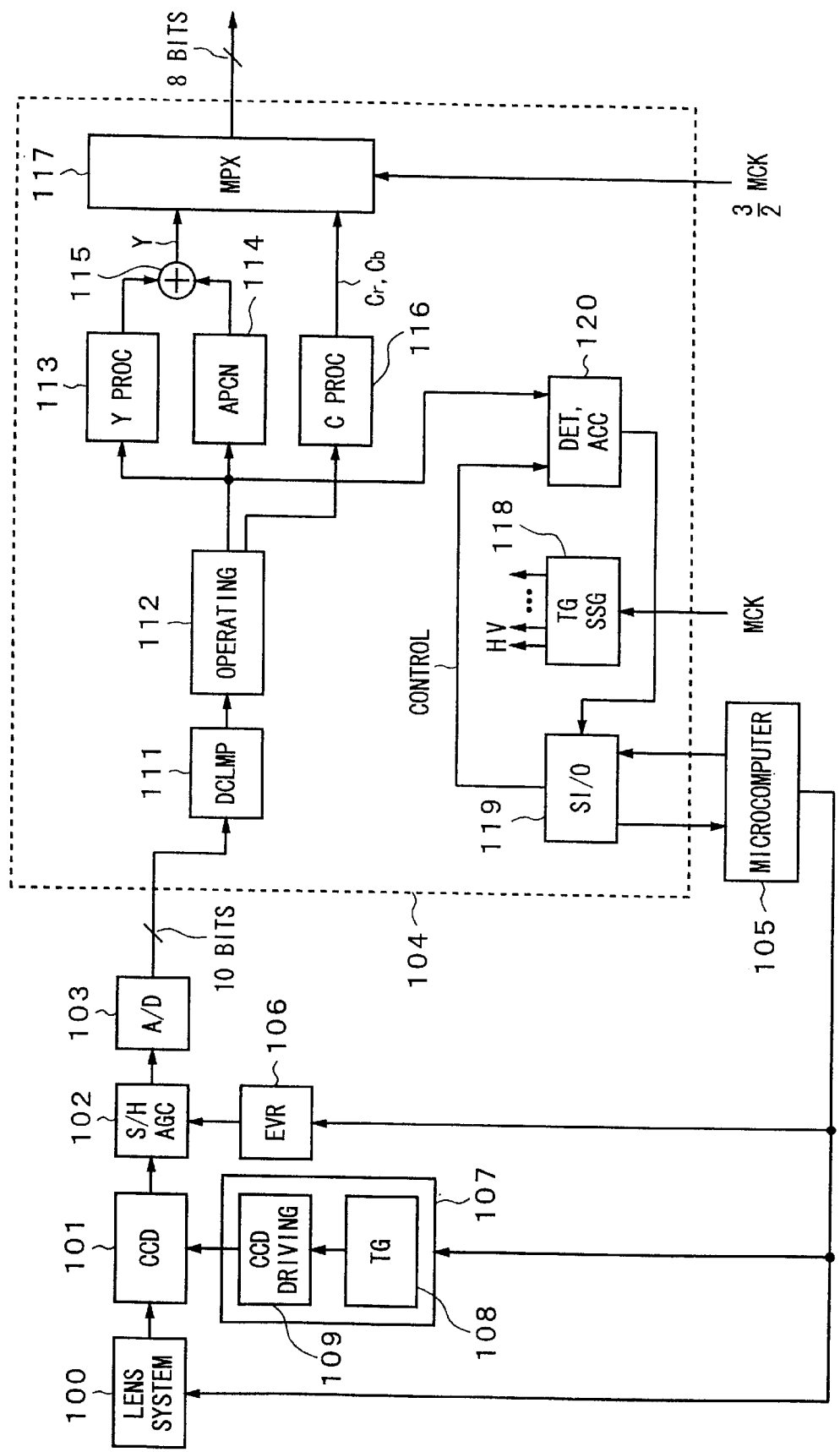
FIG. 2 is a block diagram of an example of a camera signal processing circuit according to the embodiment of the invention.

FIG. 2 shows an example of the camera signal processing circuit 104. In this example, a construction in case of including the auto aperture control circuit is shown. For simplicity of explanation, the defect compensating circuit, auto focus control circuit, and auto white balance correcting circuit are not shown. A digital image pickup signal of a width of 10 bits from the A/D converter 103 is supplied to an operating circuit 112 through a digital clamping circuit 111. When the CCD has three primary color filters, an addition or subtraction of three primary color signals is executed by the operating circuit 112, so that a luminance signal component and color difference signal components are formed.

The luminance signal component is supplied to a luminance signal processing circuit 113 and an outline correcting circuit 114 and the color difference signal components are supplied to a chrominance signal processing circuit 116. A gamma (γ) correcting circuit and the like are included in the luminance signal processing circuit 113. An outline correction signal formed by the outline correcting circuit 114 is added to an output signal of the luminance signal processing circuit 113 by an adding circuit 115. The luminance signal Y is derived from the adding circuit 115. A γ correcting circuit, an HVE control circuit, a gain control circuit, and the like are included in the chrominance signal processing circuit 116. The color difference signals Cr and Cb are generated from the chrominance signal processing circuit 116. The component signal comprising Y, Cr, and Cb is supplied to a multiplexer 117. Those signals are synthesized by the multiplexer 117 as will be explained hereinlater and a multiplex component signal is generated as an output of the multiplexer 117.

A timing and sync signal generating circuit 118 is provided. The horizontal sync signal H, vertical sync signal V, a clock, and a timing signal are generated from the generating circuit 118 on the basis of the clock MCK. Reference numeral 119 denotes a serial I/O for an interface between the microcomputer 105 and camera signal processing circuit 104. Reference numeral 120 denotes a detecting and accumulating circuit. The luminance signal component formed by the operating circuit 112 is supplied to the detecting and accumulating circuit 120. In case of an aperture control, an image pickup screen is divided into a plurality of regions and the image pickup signal is accumulated every region. Accumulation data of each region is outputted from the detecting and accumulating circuit 120 to the serial I/O 119.

The microcomputer 105 receives the accumulation data through the serial I/O 119 and executes a weighting operation for the accumulation data, an operation to obtain the sum of the weighted data of the respective regions, a generation of an aperture control signal, and the like. By the generated aperture control signal, a driving motor of an aperture control ring of the lens system 100 is driven and the timing controller 107 and electronic volume 106 are controlled. An electronic shutter (exposure time) is controlled by the timing controller 107. A gain is controlled by the electronic volume 106. A control signal is supplied from the microcomputer 105 to the detecting and accumulating circuit 120 through the serial I/O 119 and a dividing pattern or the like of the region is controlled.

Figure 3:
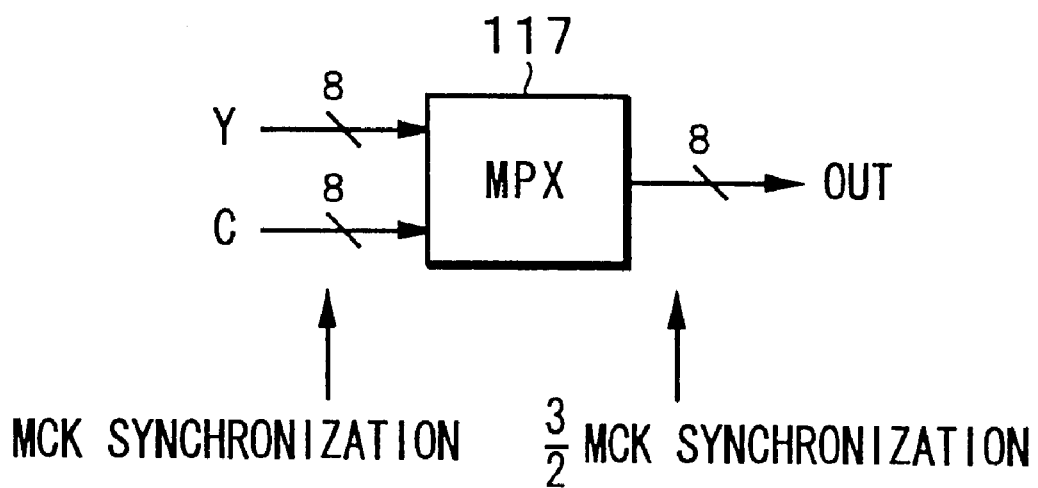
FIG. 3 is a block diagram of a portion of a multiplexer in the camera signal processing circuit.
Figure 4:
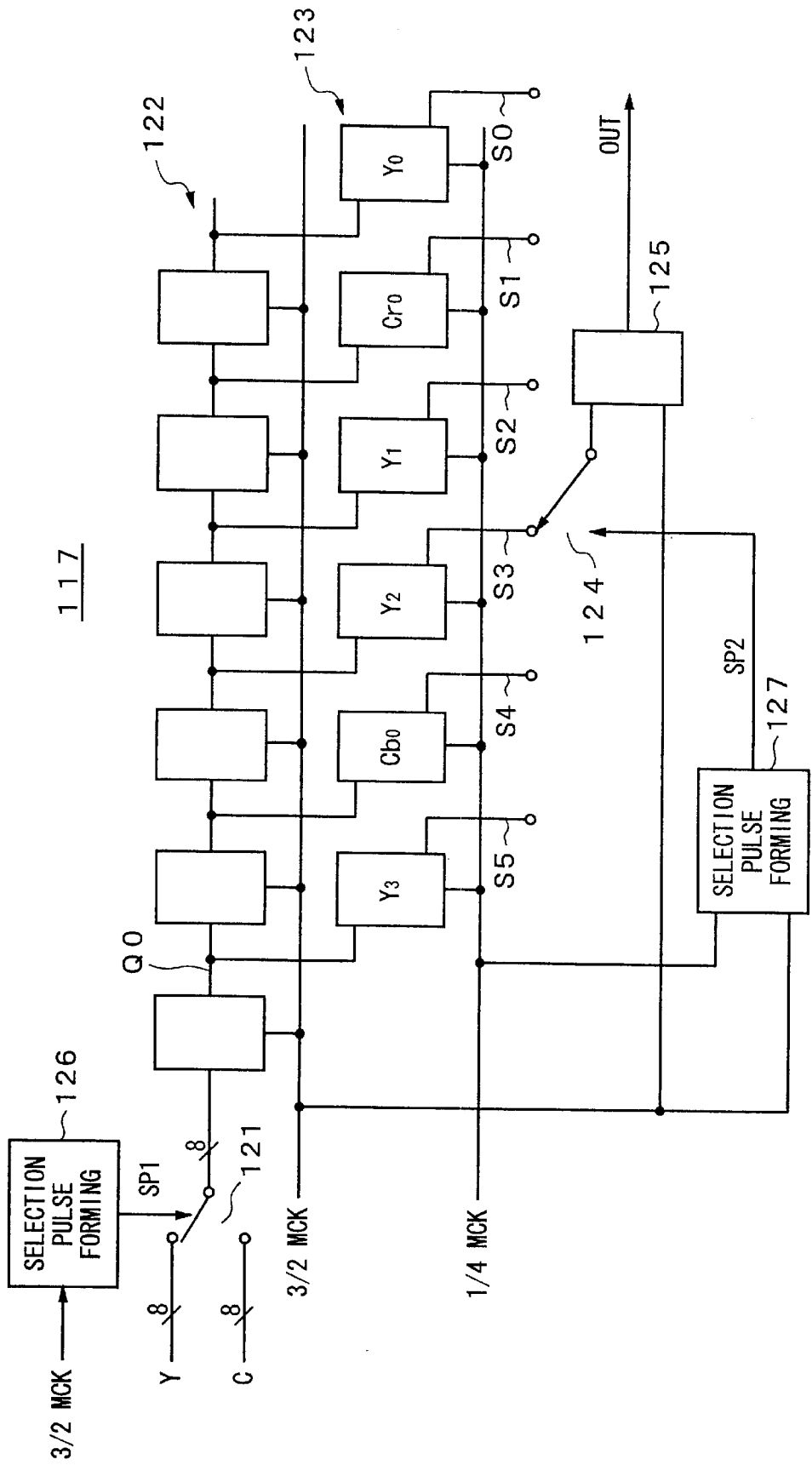
FIG. 4 is a block diagram of an example of the multiplexer.

The multiplexer 117 to multiplex the component signal of the (411) system will now be described in more detail. As shown in FIG. 3, the multiplexer 117 receives the luminance signal Y and chrominance signal C each having a width of eight bits and each of which is synchronized with the clock MCK and generates a multiplexed component signal of a width of eight bits which is synchronized with the clock 3/2 MCK (clock of a frequency that is 3/2 times as high as the clock MCK). FIG. 4 shows a construction of an example of the multiplexer 117. The multiplexer 117 comprises: an input selector 121 to select one of the luminance signal Y and chrominance signal C; a shift register 122 to which the signal selected by the input selector 121 is supplied as a serial input; a register 123 to which parallel outputs of the shift register 122 are loaded; an output selector 124 to sequentially select the data loaded in the register 123; a register 125 connected to the output selector 124; a selection pulse forming circuit 126 to form a selection pulse SP1 for controlling the input selector 121 from the clock 3/2 MCK; and a selection pulse forming circuit 127 to form a selection pulse SP2 for controlling the output selector 124 from the clock 3/2 MCK and clock 1/4 MCK.

Each register corresponds to data of a width of eight bits.

Figure 5:
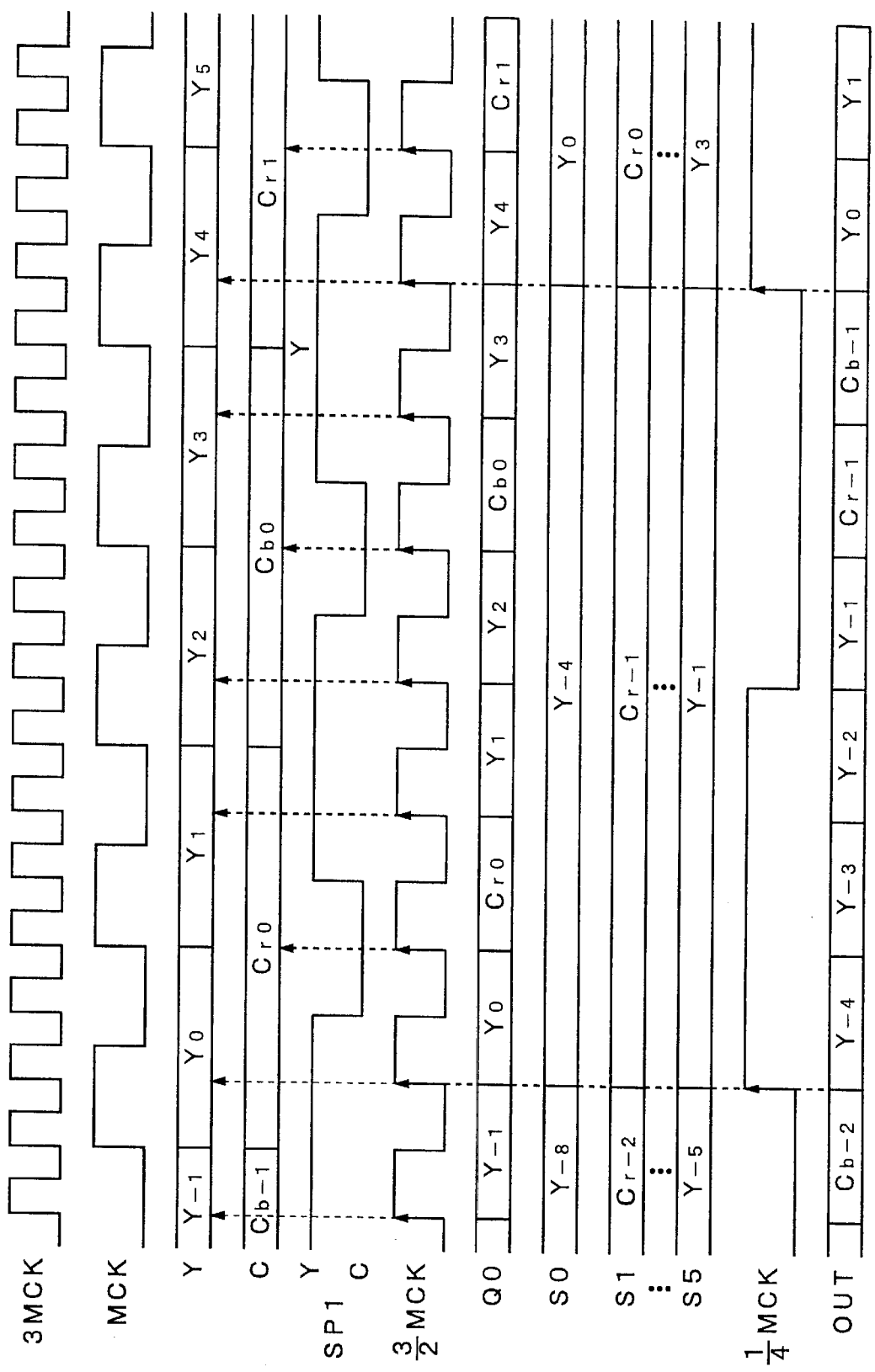
FIG. 5 is a timing chart showing the operation of the multiplexer.

FIG. 5 is a timing chart showing the operation of the multiplexer 117 mentioned above. 3MCK denotes a clock of a frequency that is three times as high as the frequency of the clock MCK. Since the luminance data Y and chrominance signal C are the component signal of the (411) system synchronized with the clock MCK, red color difference data (for example, $Cr_0$) of one sample and blue color difference data (for example, $Cb_0$) of one sample correspond to luminance data (for example, $Y_0, Y_1, Y_2, Y_3$) of four samples.

The input selector 121 is controlled so as to select the luminance data at the high level of the selection pulse SP1 and to select the chrominance data at the low level thereof. The clock 3/2 MCK is supplied to the shift register 122. The shift register 122 fetches the data selected by the input selector 121 and serially shifts the fetched data. An output $Q_0$ of the register at the first stage of the shift register 122 changes like $Y_{-1}, Y_0, Cr_0, Y_1, Y_2, Cb_0, Y_3, \ldots$ Outputs of the shift register 122 are loaded into the register 123 in parallel at a timing of the clock 1/4 MCK. A period of the clock 1/4 MCK is six times as long as a period of 3/2 MCK. A phase of the clock 1/4 MCK is selected so that total six samples of the luminance data and color difference data which are concerned with each other are transferred from the shift register 122 to the register 123.

FIG. 5 shows values of S0, S1, and S5 among values S0 to S5 of the registers 123. The selection pulse forming circuit 126 counts the clock 3/2 MCK by using the clock 1/4 MCK as a trigger, thereby generating the selection pulse SP2 having a frequency of 3/2 MCK.

The output selector 124 sequentially selects samples from the register 123 in accordance with the order of $Y_0, Y_1, Y_2, Y_3$, Cr, and Cb on the basis of the selection pulse SP2 and the register 125 fetches the selected sample. Therefore, the multiplexed component signal is generated from the register 125 so as to have the order of (Y, Y, Y, Y, Cr, Cb).

The multiplexer 117 changes the sampling clock frequency of the data from the frequency of MCK to the frequency of 3/2 MCK that is 1.5 times as high as the frequency of MCK, thereby converting into the multiplexed component signal having a width of 8 bits. In the case where the multiplexer 117 is not provided and the luminance signal Y and chrominance signal C are outputted in parallel, the data (luminance signal Y and chrominance signal C) having a width (8×2=16 bits) is outputted from the camera signal processing circuit 104. In this case, since the number of wirings is large, crosstalks among the wirings are likely to be generated and an area that is required for the board wirings increases.

Since a width of data of a DRAM 141 increases, various problems such as increase in size of DRAM 141, increase in electric power consumption of the DRAM 141, and the like occur. By providing the multiplexer 117 on the output side of the signal processing circuit 104, the occurrence of those problems can be prevented.

Returning to FIG. 1, the embodiment of the invention will be further described. The component signal multiplexed as mentioned above is supplied from the camera signal processing circuit 104 to a data switcher 130. The data switcher 130 has: an output point a connected to the output of the camera signal processing circuit 104; an input point b connected to a converting circuit 134 for converting the component signal into three primary color signals; and an input/output point c connected to a recording and reproduction data bus 140. A state of the data switcher 130 is controlled by mode switching signals 131, 132, and 133 generated on the basis of key operations or the like of the user. The microcomputer 105 in FIG. 1 is mainly provided for control of a camera unit. Although not shown, a microcomputer is provided for each of a control of the recording and reproducing operations and a control of the whole apparatus and a communication is performed between those microcomputers.

Three primary color signals R, G, and B generated by the converting circuit 134 are supplied to a television display apparatus, for example, a liquid crystal display 135. The pickup image is displayed by the liquid crystal display 135. The liquid crystal display 135 displays a color image by a noninterlace system at a period of 1/60 second. A memory which can be accessed at random, for example, the DRAM (Dynamic Random Access Memory) 141 and an encoder/decoder for data compression, for instance, an encoder/decoder 142 of JPEG (Joint Photographic Experts Group) are connected to the recording and reproduction data bus

140. A high efficient coding of a system other then the JPEG can be also used. A recording medium, for example, a flash memory 143 and an interface (not shown) are connected to the encoder/decoder 142. The operation of the DRAM 141 is controlled by an address signal and a control signal which are supplied from a memory controller 145.

The encoder/decoder 142 compresses a data amount into about 1/10 by the JPEG, namely, an adaptive DCT (Discrete Cosine Transform). The DRAM 141 is provided for a process of block segmentation or the like in the JPEG. The flash memory 143 is a semiconductor memory such that the storage contents are held even if a power source is turned off and data can be electrically erased and rewritten in a lump every whole memory or every divided region. As a recording medium, a medium such as a semiconductor memory or the like other than the flash memory can be also used. Further, an interface to supply compressed still image data to a personal computer as necessary can be also provided. In an embodiment of the invention, "recording" denotes that the image pickup signal is coded and written into the flash memory 143 and "reproduction" denotes that the data in the flash memory 143 is read out and the read-out data is decoded.

The foregoing embodiment of the invention will now be described in more detail. In the embodiment, five kinds of operations can be performed in accordance with a connecting state of the data switcher 130. They are constructed by a monitoring mode, a first recording mode, a second recording mode, a first reproducing mode, and a second reproducing mode. Those modes are set by the mode switching signals 131, 132, and 133. The mode switching signals 131, 132, and 133 are generated from a microcomputer (not shown) for controlling the recording/reproducing system. The mode switching signals can be also generated by the microcomputer 105. In the monitoring mode, the image pickup picture plane is displayed on the liquid crystal display 135. In the first recording mode, a desired pickup image is written into the DRAM 141. In the second recording mode, the image data stored in the DRAM 141 is compressed and written into the flash memory 143. In the first reproducing mode, the data stored in the flash memory 143 is read out and the read-out data is decoded and written into the DRAM 141. In the second reproducing mode, the data in the DRAM 141 is read out and displayed on the liquid crystal display 135.

Figure 6:
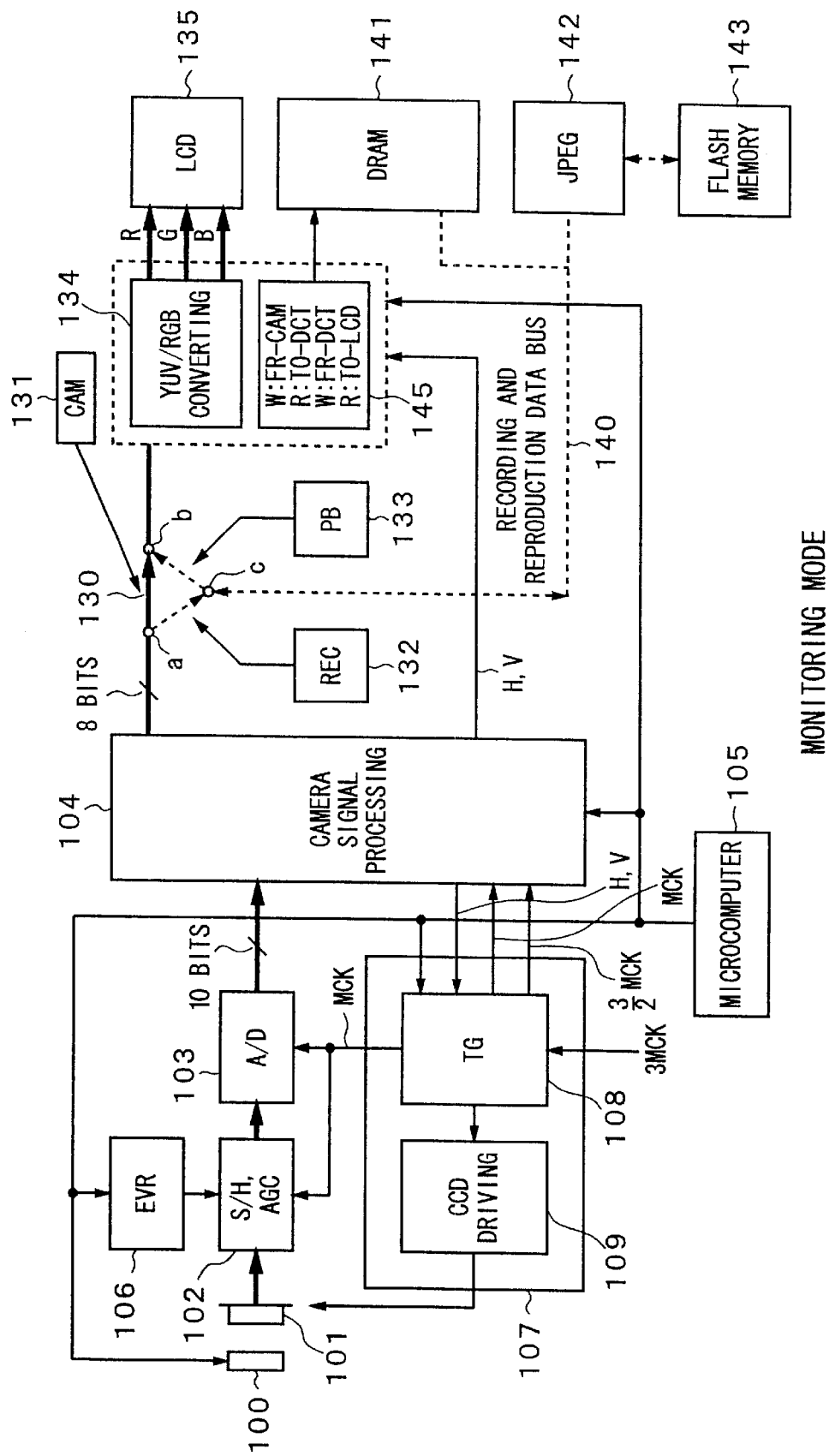
FIG. 6 is a block diagram showing a connecting relation of a monitoring mode in the embodiment of the invention.

FIG. 6 shows a connection of the monitoring mode in which the output point a and input point b of the data switcher 130 are connected. The monitoring mode is set by making the mode switching signal 131 active. In the monitoring mode, the microcomputer 105 controls the CCD driving circuit 109 of the timing controller 107 and makes the CCD 101 operative in a line thinning mode, which will be explained hereinlater. Lines which are not read out are generated from the CCD 101 and the image pickup signal is read out at a period of ⅟60 second.

In the monitoring mode, the output signal of the signal processing circuit 104 is supplied to the converting circuit 134 through the data switcher 130. The three primary color signals which are generated from the converting circuit 134 are supplied to the liquid crystal display 135 and displayed. Since the CCD 101 operates in the line thinning mode, the liquid crystal display 135 can perform a noninterlace display at a period of ⅟60 seconds. By observing the display on the LCD 135, an adjustment or the like of an angle of view is executed and a still image to be recorded can be determined. Although a vertical resolution deteriorates as compared with that upon recording due to the line thinning mode, it doesn't cause a problem for an object of monitoring the photographed image. Such a vertical resolution is equivalent to that of a conventional CCD camera for performing a field accumulation.

In the line thinning mode, a trackability for a motion of an object is improved because of a high speed reading. Therefore, a response speed of the automatic control such as auto focus control, auto aperture control, or the like is improved and it is suitable to monitor a motion image.

In the monitoring mode, the DRAM 141, encoder/decoder 142, and flash memory 143 which are connected to the data bus shown by a broken line are made inoperative. In order to save an electric power consumption, it is desirable to turn off the power supply to those inoperative circuits or to stop the supply of the clock that is necessary for the operation. In the other modes which will be explained hereinafter as well, a bus for the circuit which is made inoperative is shown by a broken line and the power supply to the circuit which is made inoperative is turned off in a manner similar to the above.

Figure 7:
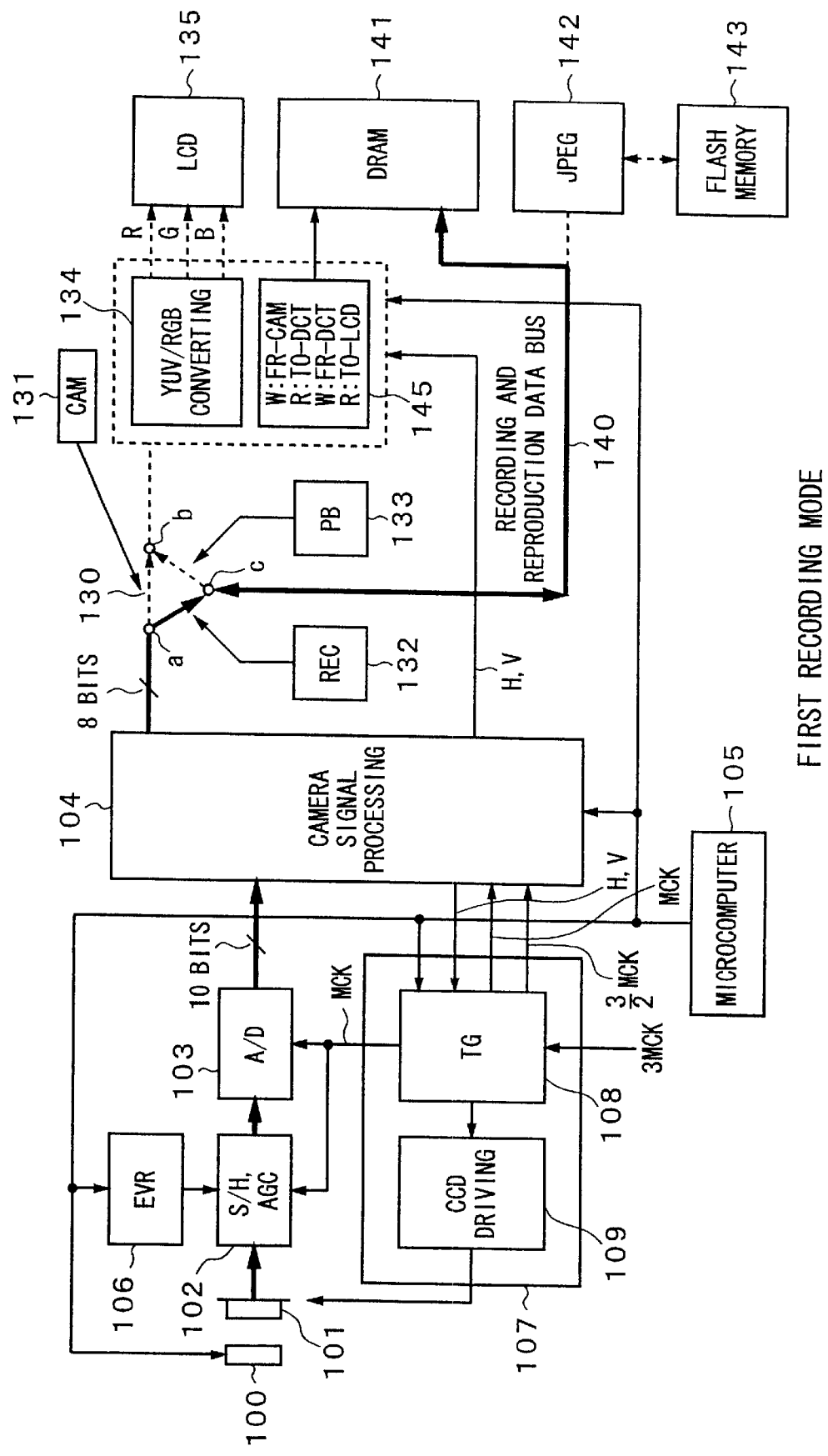
FIG. 7 is a block diagram showing a connecting relation of a first recording mode in the embodiment of the invention.

FIG. 7 shows a connection in a mode in case of recording a still image, namely, in the first recording mode in which the output point a and input/output point c of the data switcher 130 are connected. The first recording mode is set by making the mode switching signal 132 active by a method of pressing a release switch (not shown) or the like. In the first recording mode, the microcomputer 105 controls the CCD driving circuit 109 of the timing controller 107 and makes the CCD 101 operative in the full-frame reading mode. From the CCD 101, signals of all pixels, for example, 320,000 pixels are read out without being mixed and the image pickup signal at a period of ⅟30 second is read out.

The image pickup signal is processed by the camera signal processing circuit 104 and is written into the DRAM 141 through the output point a and input/output point c of the data switcher 130 and through the recording and reproduction data bus 140. The memory controller 145 sets the DRAM 141 into a writing mode and supplies a write address to the DRAM 141. The memory controller 145 is controlled by a microcomputer (not shown) for controlling the recording/reproducing system. Still image data of one image is written into the DRAM 141. In the first recording mode in which the image data of ⅟30 second is written, the image cannot be displayed on the LCD 135. In order to minimize the time during which the image is not displayed, when the writing operation is finished, the operating mode is immediately shifted to the next second recording mode.

Figure 8:
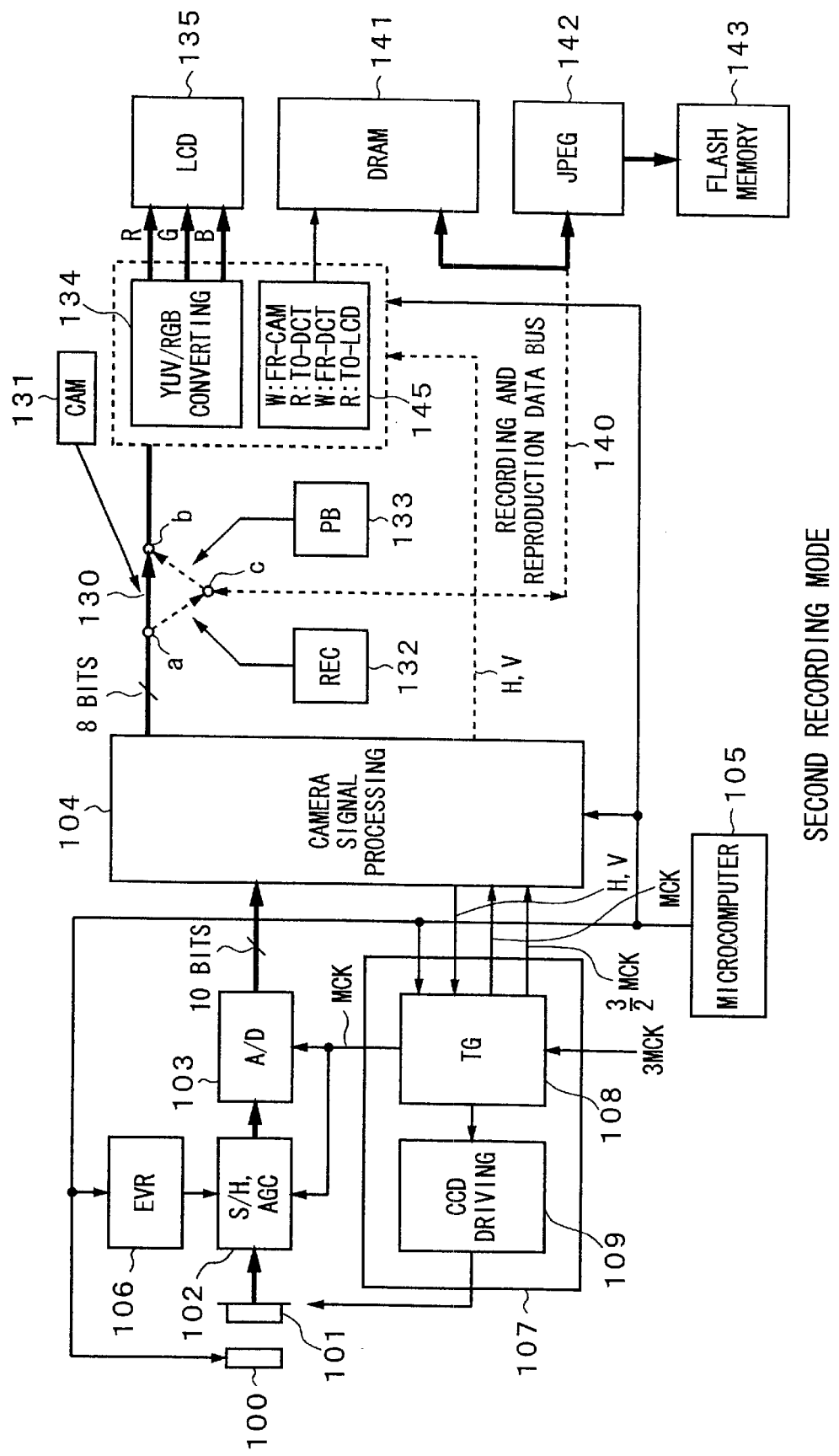
FIG. 8 is a block diagram showing a connecting relation of a second recording mode in the embodiment of the invention.

After completion of the writing of the image data of one image into the DRAM 141, the data switcher 130 is set to the second recording mode in which the output point a and input point b are connected as shown in FIG. 8. The second recording mode is set by making the mode switching signal 131 active. In the second recording mode, the image data is read out from the DRAM 141. The read-out data is supplied to the encoder/decoder 142 through the bus 140. The encoder/decoder 142 compresses the data read out from the DRAM 141 by, for example, the JPEG. The compressed data is written into the flash memory 143. As mentioned above, the pickup image is compressed and recorded.

In the second recording mode, the CCD 101 operates in the line thinning mode. In a manner similar to the monitoring mode, the signal read out from the CCD 101 is processed at a high speed by the camera signal processing circuit 104. The image signal is supplied to the LCD 135 through the data switcher 130 and converting circuit 134 and the image is displayed. Thus, a time which is required until the display of the image is deleted from the LCD 135 upon recording can be minimized.

Figure 9:
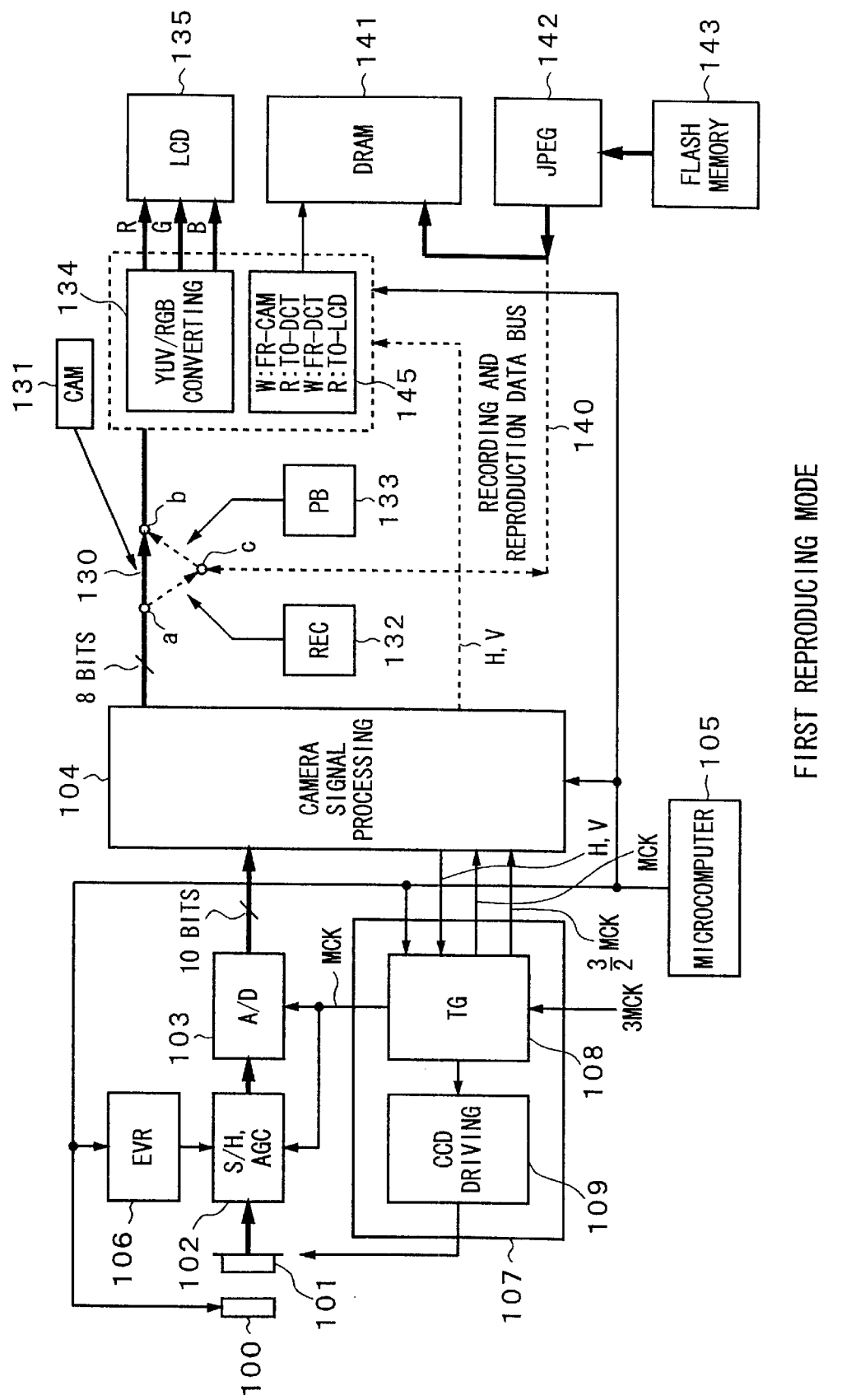
FIG. 9 is a block diagram showing a connecting relation of a first reproducing mode in the embodiment of the invention.

In the reproducing mode, the image data written in the flash memory 143 is reproduced and displayed by the LCD 135. FIG. 9 shows a state of the first reproducing mode in which the output point a and input point b of the data switcher 130 are connected and the image pickup signal is displayed on the LCD 135. The first reproducing mode is set by making the mode switching signal 131 active by a method of depressing a playback button (not shown) by the user or the like. In this mode, the data is read out from the flash memory 143 and the read data is supplied to the encoder/decoder 142.

The data is decoded by the encoder/decoder 142 and the image data is generated. The DRAM 141 is controlled so as to write the image data. In this case, the memory controller 145 controls the write address in the DRAM 141 so that the decoding data is written into the DRAM 141 in the same data array with that in the first recording mode. A similar data array can be also realized by an address control upon reading. The above relation is necessary to use the same circuit as that which is used in the monitoring mode in case of supplying the digital image signal read out from the DRAM 141 to the LCD 135 through the converting circuit 134 and displaying by the LCD 135. In the first reproducing mode, the CCD 101 is driven in the line thinning mode and the image pickup image of the CCD 101 is displayed on the LCD 135.

Figure 10:
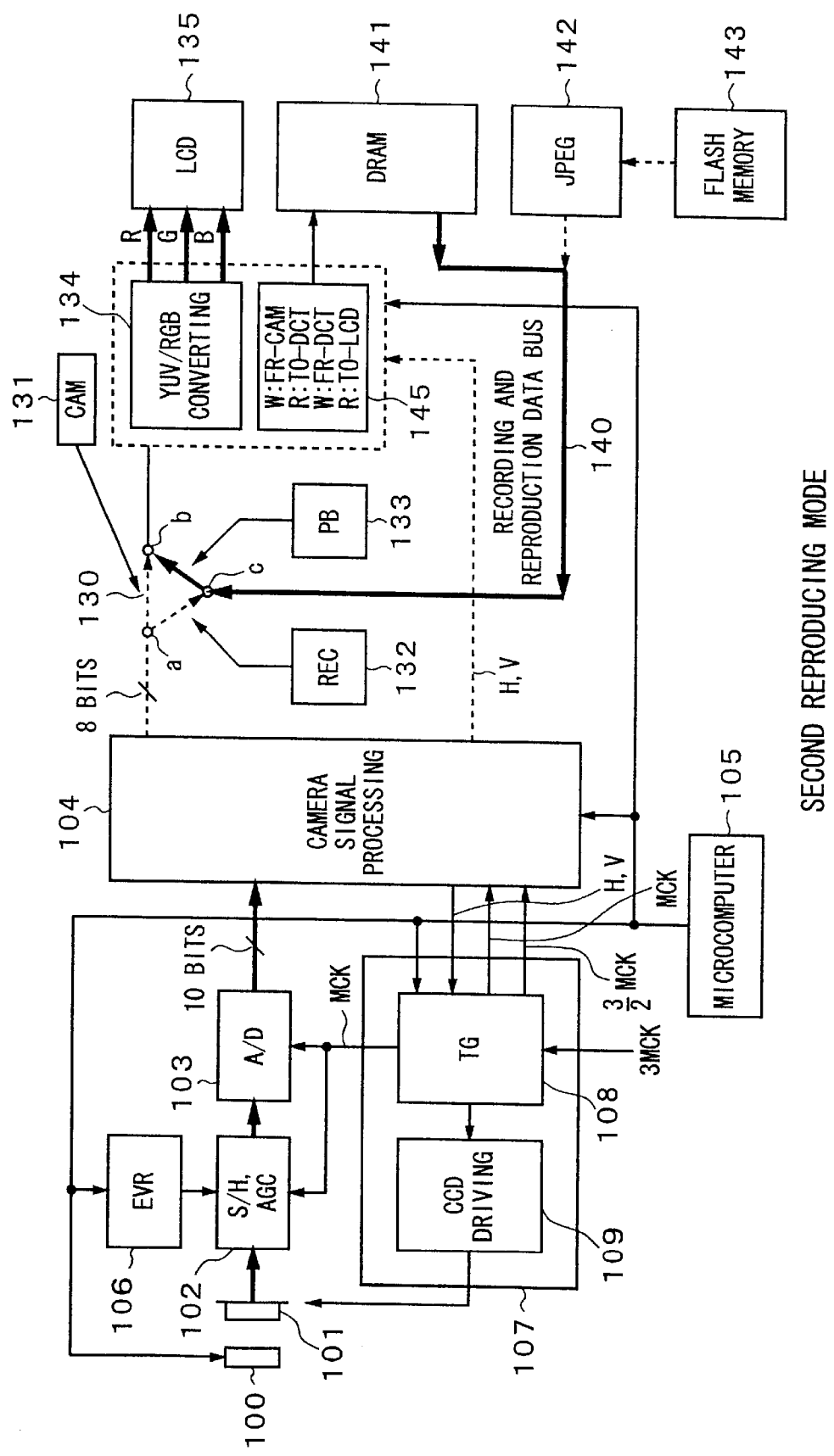
FIG. 10 is a block diagram showing a connecting relation of a second reproducing mode in the embodiment of the invention.

When the decoding data is written into the DRAM 141, the second reproducing mode shown in FIG. 10 is immediately automatically set. In the second reproducing mode, the input/output point c and input point b of the data switcher 130 are connected. The second reproducing mode is set by making the mode switching signal 133 active. The DRAM 141 is set into the reading mode. The data read out from the DRAM 141 is supplied to the LCD 135 through the recording and reproduction data bus 140, data switcher 130, and converting circuit 134. Therefore, the image corresponding to the data recorded in the flash memory 143 can be seen by the LCD 135. In this case, the data recorded in the flash memory 143 is not the line thinning data but the full-frame data. Therefore, a line thinning similar to the case where the CCD 101 is driven in the line thinning mode is realized by the address control by the memory controller 145. Namely, only the data of every other line is read out. Thus, the read-out data from the DRAM 141 can be reproduced by the LCD 135.

In this manner, the still image data stored in the flash memory 143 can be reproduced and seen by the LCD 135. The number of still images which can be recorded is determined in dependence on a memory capacity of the flash memory 143, a data compressing method, or the like. As for a flash memory 143, it is preferable to use a construction of a detachable IC card. A recording medium other than the flash memory can be also used. Further, it is also possible to transmit the recording data to an external personal computer through an interface provided as necessary or to store the recording data into an external storage device.

Figure 11:
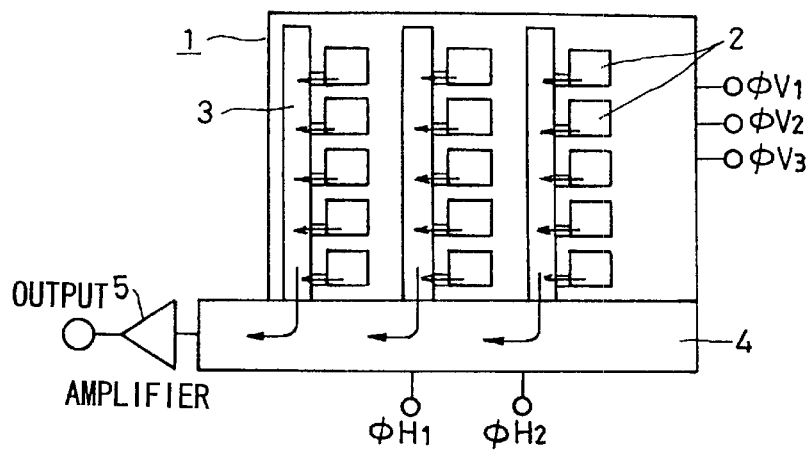
FIG. 11 is a diagram showing a schematic construction of an example of an image pickup device which can be used in the invention.

An example of the CCD 101 will now be described hereinbelow. FIG. 11 schematically shows an example of a CCD 1. In this example, the CCD 1 uses an interline system and has: photosensors (for example, photodiodes) 2 which are two-dimensionally arranged in an image area; vertical CCDs (vertical transfer unit) 3, arranged among the photosensors 2, for transferring signal charges from the photosensors 2 to a horizontal CCD (horizontal transfer unit) 4; and a buffer amplifier 5 connected to the horizontal CCD 4. The image pickup light transmitted through color filters with an array as will be explained hereinlater enters the photosensors 2. One photosensor 2 corresponds to one bit in the vertical CCD 3. The signal charges from the photosensors 2 can be read out to the vertical CCDs 3 without mixing. The signals of all pixels can be sequentially transferred to the horizontal CCD 4 without mixing. By driving the horizontal CCD 4, the signal is transferred into the buffer amplifier 5 as a floating diffusion area and is sequentially converted into a voltage and outputted.

Figure 12:
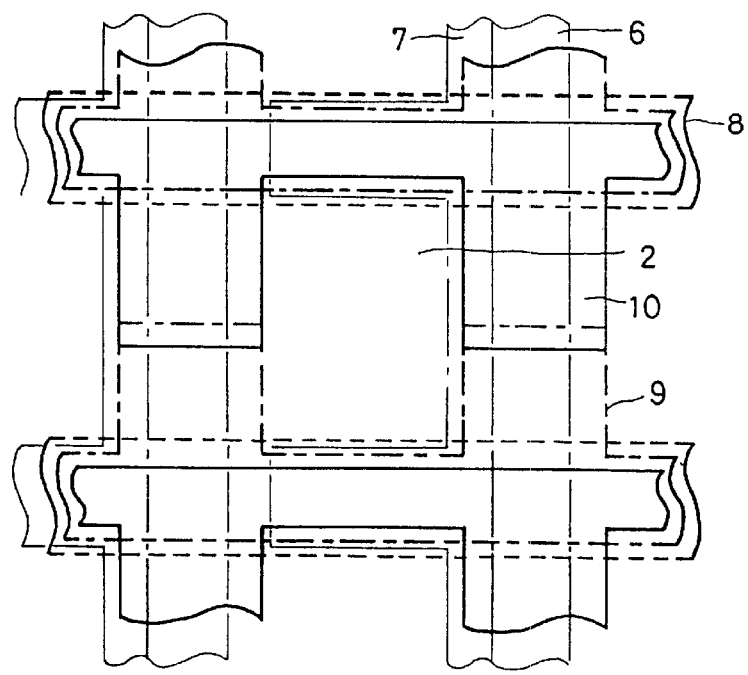
FIG. 12 is an enlarged plan view showing a part of one pixel in an example of the image pickup device.
Figure 13:
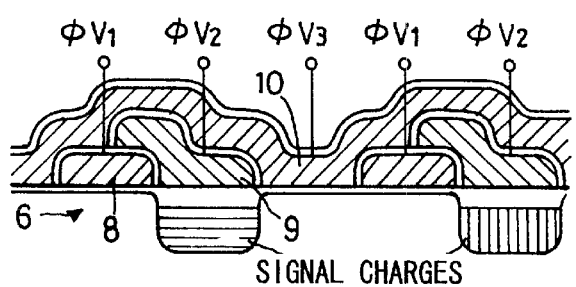
FIG. 13 is a schematic diagram showing a structure of a vertical CCD in the example of the image pickup device.

FIG. 12 shows a plan view of a unit pixel of the CCD 1. FIG. 13 shows a structure of the vertical CCD 3. The vertical CCD 3 has a structure of, for example, the 3-layer electrode and 3-phase driving. In FIG. 12, reference numeral 6 denotes a transfer channel of the vertical CCD 3; 7 a channel stopper for separating among the pixels and among the pixels and the transfer channel; and 8, 9, and 10 transfer gates of the vertical CCDs 3, respectively. The transfer gate 9 is commonly used as a read gate. In FIG. 12, a light shielding film and the like are omitted and are not shown. As shown in FIG. 13, the transfer gates 8, 9, and 10 are formed by working first, second, and third polycrystalline silicon electrodes. Vertical driving pulses $\phi V_1$, $\phi V_2$, and $\phi V_3$ are respectively supplied to the transfer gates 8, 9, and 10.

When the signals are read out from the photosensors 2 to the vertical CCDs 3, a bias voltage (referred to as a read pulse) at a level higher than the high level of the vertical transfer clock $\phi V_2$ is applied to the transfer gate adjacent to the photosensors 2, namely, the transfer gate 9 also serving as a read gate. When the read pulse is supplied to the gate 9, since one pixel corresponds to one bit of the vertical CCD 3, the signal charges from all of the photosensors 2 are read out to the vertical CCDs 3. The horizontal CCD 4 generates the data of one line by transfer clocks $\phi H_1$ and $\phi H_2$. For instance, a CCD with a compound channel horizontal CCD structure can be used as a horizontal CCD 4. In this case, an output unit has a construction of two channels.

Since the above CCD can sequentially generate the signals of all pixels without mixing, it is suitable for an electronic still camera and an image fetching. However, as compared with an image pickup device for a video camera having the same number of pixels for performing an interlace output, when the charges are transferred by the same clock, an output time of one picture plane (from the top to the bottom of the screen) is doubled. In this example, as mentioned above, as a signal for monitoring and an image pickup signal for the automatic control such as an auto focus control and the like, by reducing the number of horizontal lines, the image pickup signal of one picture plane is outputted at a high speed and, in case of the line thinning, a situation such that a color sequence in the vertical direction which is specified by the array of the color filters is broken is prevented. On the other hand, in case of fetching the photographed image into the flash memory, the image pickup signal of the full-frame (image pickup signal in which the number of lines is not thinned or decimated) is generated. Even in case of the line thinning, since the color sequence is the same as the case of the full frame, a problem such that the signal processing circuit is complicated can be avoided.

Figure 14:
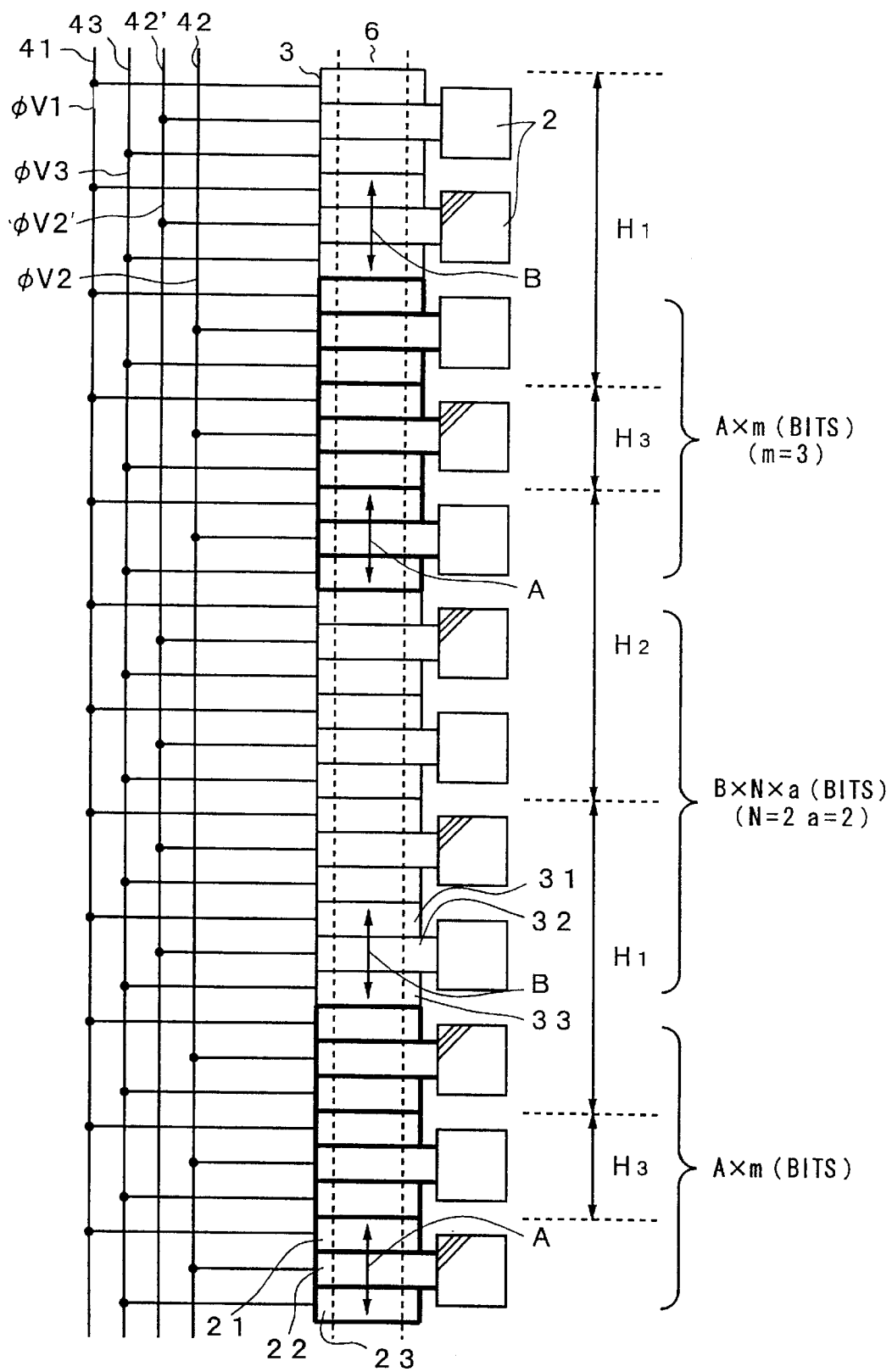
FIG. 14 is a schematic diagram showing bus wirings of one column in the vertical direction in the example of the image pickup device.

In the CCD which can read out all pixels mentioned above, the thinning of the number of lines can be realized by dividing the wirings for the transfer gate (the second polycrystalline silicon) 9 which contributes to the reading of the signal charges from,the photosensors 2 into two portions. A repetitive period of the colors is shown by N. FIG. 14 shows an example in case of (N=2) in which one period is formed by two upper and lower pixels.

As an array of color filters of the CCD of the single plate type, a structure such that R (filter for transmitting red), G (filter for transmitting green), and B (filter for transmitting blue) are arranged (Bayer system) as shown in FIG. 15A is known. The filter of G of a high sensitivity is arranged for the pixels of the half of the whole pixels. Color filters of a complementary color checkerwise array shown in FIG. 15B are also known. In FIG. 15B, Ye, Cy, and Mg denote filters of yellow, cyan, and magenta, respectively. The complementary color filters shown in FIG. 15B are often used in a video camera because a resolution can be raised as compared with the primary color filters. On the other hand, the primary color filters shown in FIG. 15A are excellent in terms of the color reproducibility and are frequently used in an electronic still camera.

As an image pickup device in the invention, any one of the single plate type image pickup device having the primary color filters and the single plate type image pickup device having the complementary color filters can be used. Further, although not shown, it is also possible to use an image pickup device (what is called a spatial picture deviating system) of a system which is constructed by an image pickup device having the filter of G and the image pickup device having an array of the filters of R and B and in which the two image pickup devices have a positional relation such that they are deviated by only ½ of a pixel pitch in the horizontal and vertical directions.

In the array of FIG. 15A, the repetitive period N of the colors in the vertical direction is equal to (N=2). In the array of FIG. 15B, (N=4). FIG. 14 is a schematic diagram in case of (N=2) and shows the photosensors 2 of one column in the vertical direction, vertical CCDs 3, and bus wirings of the gates of the vertical CCDs 3 with respect to a part of one column. Among the photosensors 2, the photosensor in which a hatched portion is provided in the left upper corner corresponds to one color filter, for example, filter of G and the photosensor without a hatched portion corresponds to the other color filter, for instance, filter of B. As mentioned above, the vertical CCD 3 is of the type of the 3-layer electrode and 3-phase driving and has gates of three bits so as to be neighboring to opening pixels (pixels which are not shielded against the light) of the CCD. The vertical CCD 3 includes a first region A and a second region B. The first region A comprises gates 21, 22, and 23 and the second region B comprises gates 31, 32, and 33. The gates 22 and 32 are read gates also serving as transfer gates. Reference numerals 41, 42, 42', and 43 denote bus wirings to which the driving pulses φV$_1$, φV$_2$, φV$_2$', and φV$_3$ for vertical transfer are supplied, respectively.

The gates 21 and 31 are connected to the bus wiring 41 and the gates 23 and 33 are connected to the bus wiring 43. The driving pulses φV$_1$ and φV$_3$ are supplied to the bus wirings 41 and 43, respectively. With respect to the driving pulse φV$_2$, two buses 42 and 42' are provided. The first region A indicates a region in which the transfer and read gate 22 is connected to the bus 42. The second region B indicates a region in which the transfer and read gate 32 is connected to the bus 42'. In FIG. 14, for simplicity of drawing, although only one side of the bus lines is drawn, generally, the bus lines are arranged on both sides of the photosensor 2 and both sides are driven.

In the above image pickup device, a range in which m (m=1, 2, 3, . . . ) first regions A are arranged and a range in which (N×a) second regions B are arranged are alternately formed in the vertical direction for the purpose of line thinning. The example shown in FIG. 14 relates to a case of (N=2, m=3, a=2). Although values of m and a can arbitrarily selected, even if m and a are set to large values, it is necessary that (m+N×a) is smaller than the number of vertical pixels among the number of effective pixels.

In the foregoing image pickup device, in the first operating mode, namely, at the time of the full-frame operation to read out the signals of all pixels, the signals are read out from the photosensors 2 to both of the first region A and second region B of the vertical CCD 3. For this purpose, the read pulses are supplied to both of the gates 22 and 32 through the bus wirings 42 and 42'. In this case, the chrominance signals are generated by a color sequence corresponding to the order of the array of the color filters, for example, by the sequence of G, B, G, B, . . .

In the second operating mode, namely, at the time of the line thinning operation, on the other hand, the read pulses are supplied to only the gate 22 of the first region A through the bus wiring 42. Therefore, the signals are read out from the range of m and the signals are not read out from the range of N×a. In the example of FIG. 14, the signals are generated from (m=3) lines and no signal is generated from (N×a=4) lines. Since the number of lines to be thinned is integer times as large as the repetitive period N of the colors, the order of the chrominance signals of the image pickup output in case of the line thinning is held in the same relation as that in the full-frame reading operation.

FIGS. 16A to 16C show timings in case of driving the image pickup device. FIG. 16A shows the timing in case of performing the full-frame reading. In each horizontal blanking period, the 3-phase driving pulses φV$_1$, φV$_2$, φV$_2$', and φV$_3$ as line shift pulses LS are supplied to the gates 21, 22, and 23 of the first region A and to the gates 31, 32, and 33 of the second region B of the vertical CCD 3, respectively. The read pulse is also supplied to both of the gates 22 and 32 every 1V. By the read pulse, the signal charges from all of the photosensors are read out to the vertical CCDs 3. As shown in a detailed timing chart of FIG. 16B, the driving pulses φV$_1$, φV$_2$, φV$_2$', and φV$_3$ which are generated within the horizontal blanking period are the pulses of three phases and a shift of charges of one line is carried out for one line shift period. At the time of the full-frame reading, a shift of one line is executed in each horizontal blanking period.

On the other hand, in case of the line thinning reading, as shown in FIG. 16C, the read pulse is applied to only the gate 22 of the first region A.

Thus, the signal charges are read out from only the photosensors adjacent to the first region A. In case of the line thinning, the signal charges are not read out to the vertical CCDs 3 of the thinned lines and no signal is generated. Such a no-signal period can be eliminated by repeating the line shifting operation a plurality of number of times.

For example, in case of the color array shown in FIG. 14, the charges of three pixels shown by H1, specifically speaking, the signal charges of one first region A and the no-signal of the two second regions B are synthesized in the horizontal CCD 4 by supplying the line shift pulse LS three times in a first horizontal period H1 as shown in FIG. 17. Similarly, by supplying the line shift pulse LS three times in a second horizontal period H2, the signal charges of one first region A and the no-signal of the two second regions B are synthesized in the horizontal CCD 4. By supplying the line shift pulse LS once in a third horizontal period H3, the signal charges of one first region A are supplied to the horizontal CCD 4 in one horizontal period. Therefore, in each horizontal period, the signal charges from one first region are outputted without changing the color sequence. The operation in the period shown in FIG. 17 is repeated every three horizontal periods.

Figure 18A:
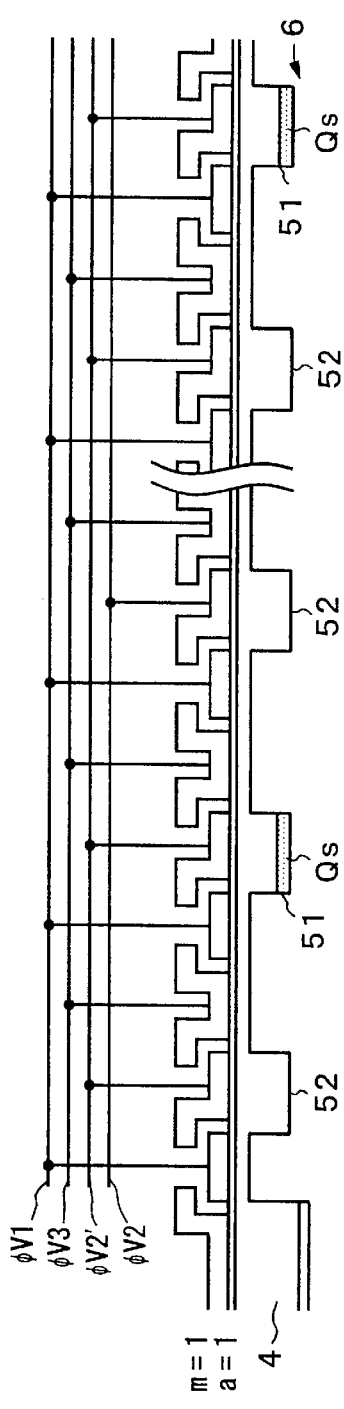
FIGS. 18A to 18C are schematic diagrams showing schematically potentials of vertical CCDs in the example of the image pickup device.

FIG. 18A is a schematic diagram of a potential of the channel 6 of the vertical CCD 3 in case of (m=1, a=1). The direction directing from the right side to the horizontal CCD 4 on the left side facing the drawing is set to the vertical transfer direction. At the time of the line thinning operation, a packet 51 including signal charges Qs and an empty packet 52 exist in the channel 6. To output the signal charges Qs from each line, a line shift is executed a number of times larger by the time corresponding to the empty packets 52, thereby mixing the signal charges and no-signal in the horizontal CCD 4 and eliminating the period of no-signal. It is sufficient that the number of times of line shift which is executed in each horizontal blanking period is set so as to satisfy the following relation.

$\geq 1$ [the number of packets including the signal charges Qs to be outputted (in this example, considered as one packet)]+X(the number of packets which exist at preceding positions and don't include the signal charges Qs)$\leq 1+X+(N \times a)$ (the number of packets which exist behind and don't include the signal charges Qs)

Thus, in case of (X=0), only the signal charges are transferred to the horizontal CCD 4. In case of (X≠0), the packets including the signal charges and one or more packets which don't include the signal charges are transferred to the horizontal CCD 4.

By the above conditions, the signal charges can be transferred to the horizontal CCD 4 and the lines of no-signal can be compressed. Actually, the charges of the empty packet are not equal to 0 and unnecessary signal charges Qn such as smear signal, dark current, and the like are includes. When the number of times of line shift which is executed in each horizontal blanking period is different, since the number of times of addition of the unnecessary signal charges Qn is different, an amount of unnecessary signals included differs depending on the lines as an actual output. There is, consequently, a fear such that a line crawl phenomenon in which a luminance is variably seen every line on the monitor or a deterioration in picture quality such as a color deviation or the like occurs.

To solve such a problem, it is sufficient to set the number of times of line shift which are executed in each horizontal blanking period to a constant value. In case of a limited condition, namely, when (m=1 or m=2), by setting the number of times of line shift of the vertical CCD 3 to [(N×a/m)+1], the number of packets which don't include the signal charges Qs which are added to the signal charges Qs of each line can be made constant. Thus, the occurrence of the deterioration of the picture quality mentioned above can be prevented.

Figure 18B:
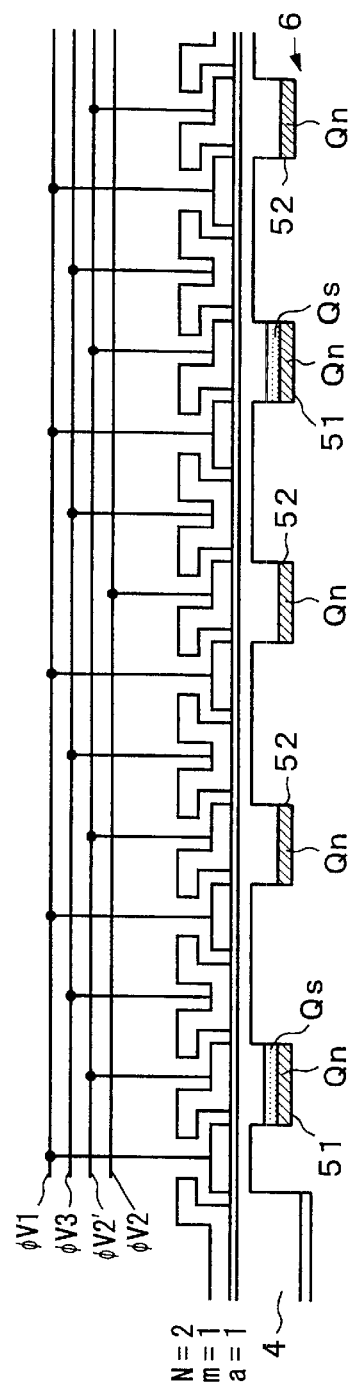
Figure 18C:
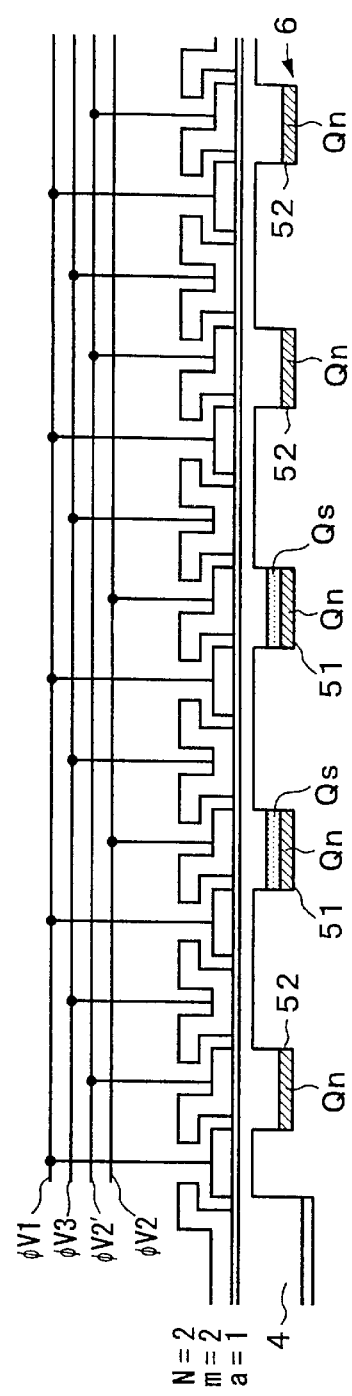

FIG. 18B is a schematic diagram of the potential of the channel 6 of the vertical CCD 3 in case of (N=2, m=1, a=1). In this example, (N×a/m=2) and by setting the number of times of line shift to 3, the number of packets which don't include the signal charges Qs which are added in each line serving as an actual output can be made constant. FIG. 18C shows a case of (N=2, m=2, a=1). In this case, (N×a/m=1) and it is sufficient to set the number of times of line shift to 2. Further, even in case of m>2, if the level of the smear signal or dark current can be sufficiently reduced, no problem occurs.

In the foregoing CCD image pickup device, since the number of lines serving as an actual output can be reduced, by selecting the value of m of the first regions A arranged and the value of (N×a) of second regions B arranged of the vertical CCD 3, the number of lines of the output image pickup signal can be suppressed to a value that is equal to or less than the number of horizontal scanning lines of a television of one field. Several examples of the number of output lines will now be described with respect to a case such as a color filter array (N=2) of the Bayer system.

As shown in FIG. 19, in case of applying the invention to an image pickup device corresponding to VGA (Video Graphics Array) in which the number of effective pixels (vertical pixels x horizontal pixels) is equal to (480×640), (a=1, m=2). In the line thinning mode, therefore, the number of output lines can be reduced to the half value, namely, 240 lines.

Figure 20:
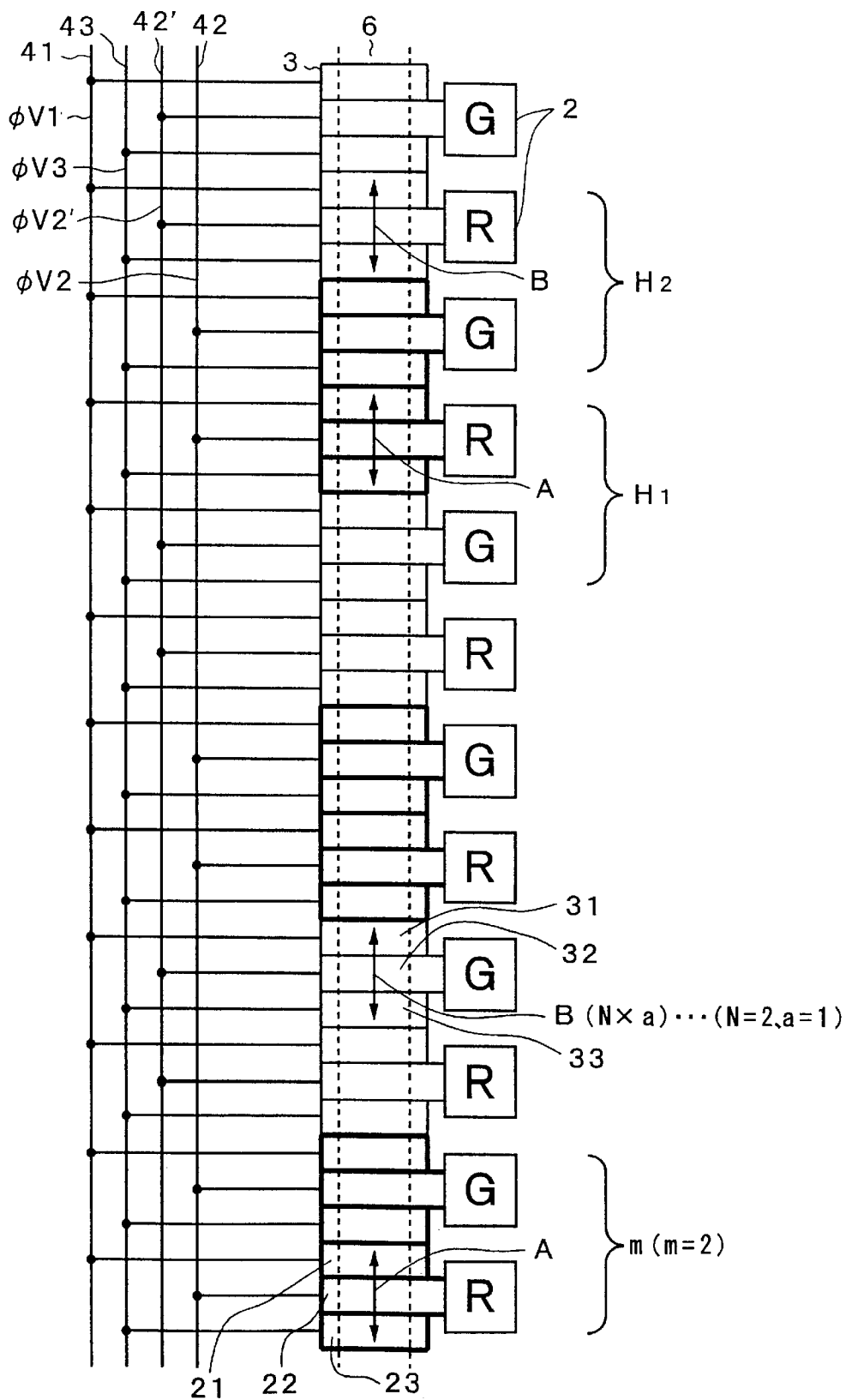
FIG. 20 is a diagram showing bus wirings of one column in the vertical direction of the image pickup device in FIG. 19.
Figure 21:
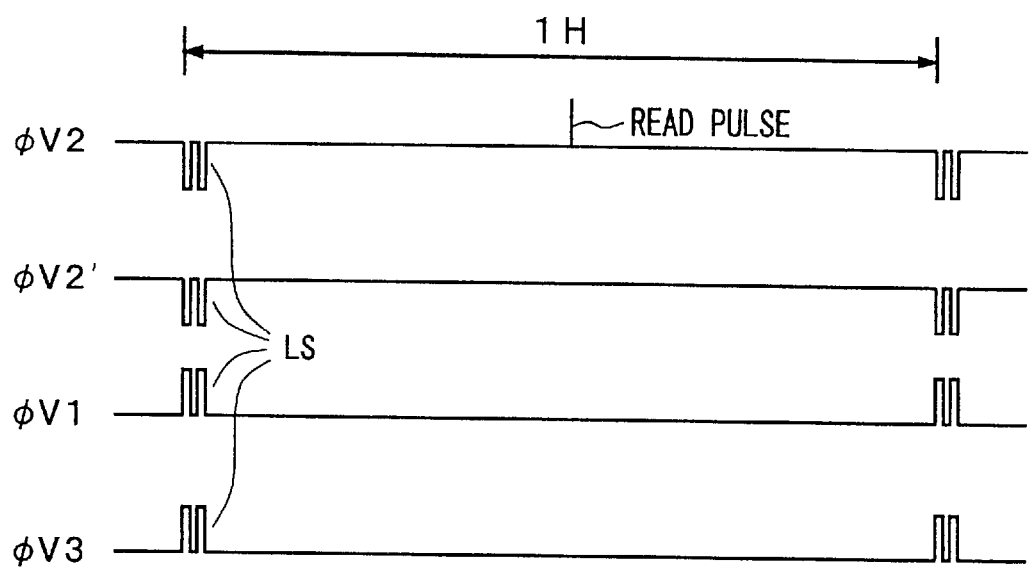
FIG. 21 is a timing chart for driving pulses in the image pickup device in FIG. 19.

FIG. 20 shows a structure of a vertical CCD of one column in the vertical direction in case of the image pickup device shown in FIG. 19. FIG. 21 shows a timing chart for driving pulses for driving the image pickup device shown in FIG. 20 in the second operating mode. Portions corresponding to those in FIG. 14 are designated by the same reference numerals and their descriptions are omitted here. In this case, in each horizontal period, the line shift pulse LS is supplied twice. In the second operating mode, the signal of only R is read out in the first horizontal period H1 and the signal of only G is read out in the second horizontal period H2. In the example shown in FIG. 20, since the number of lines which are added in each horizontal period is equal, the problem of the color deviation and the like don't occur.

Figure 22:
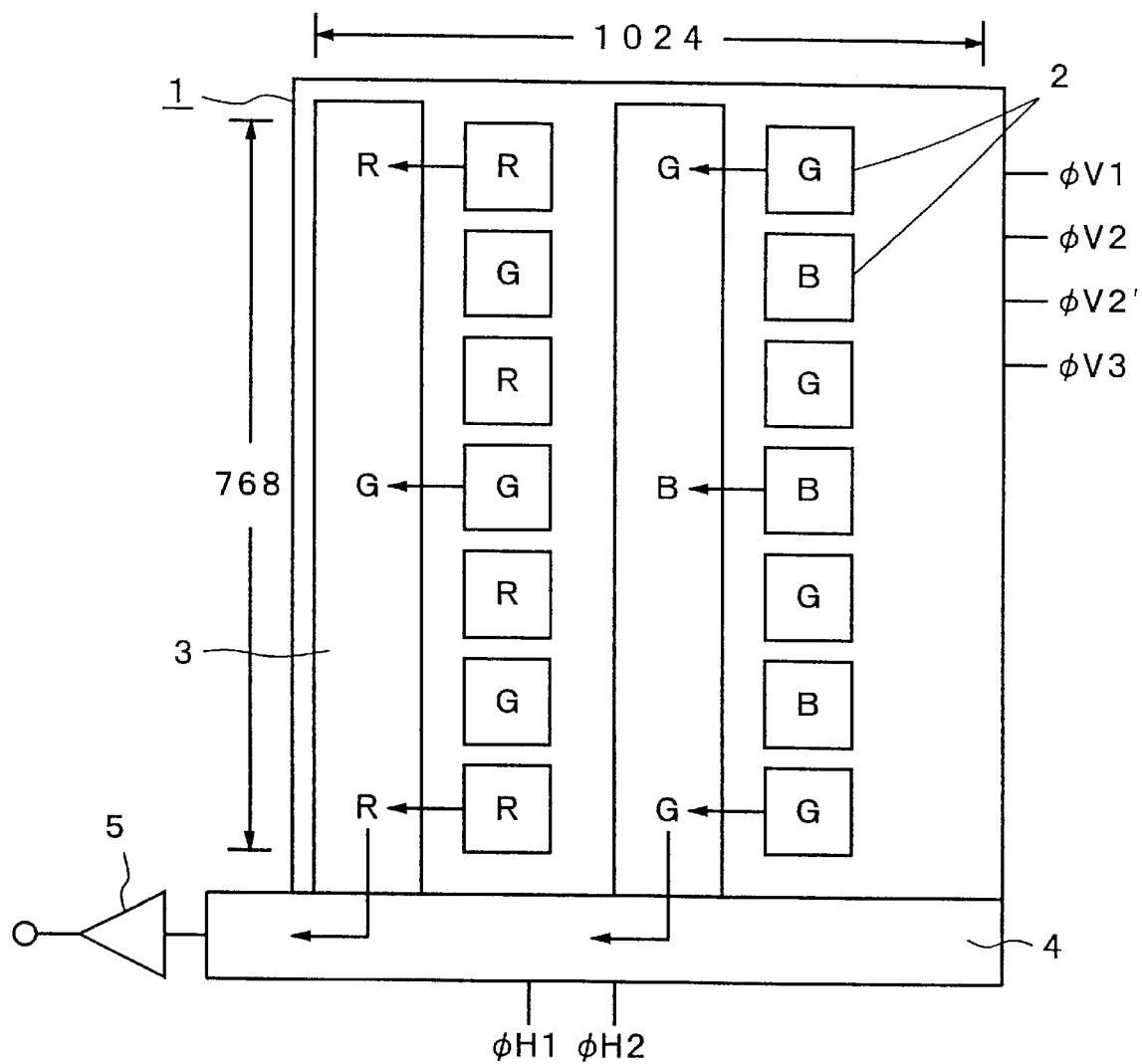
FIG. 22 is a schematic diagram showing another specific example of an image pickup device.

As shown in FIG. 22, in an image pickup device in which the number of effective pixels is equal to (768×1024), by setting (m=1, a=1), the number of output lines can be set to 256.

Figure 23:
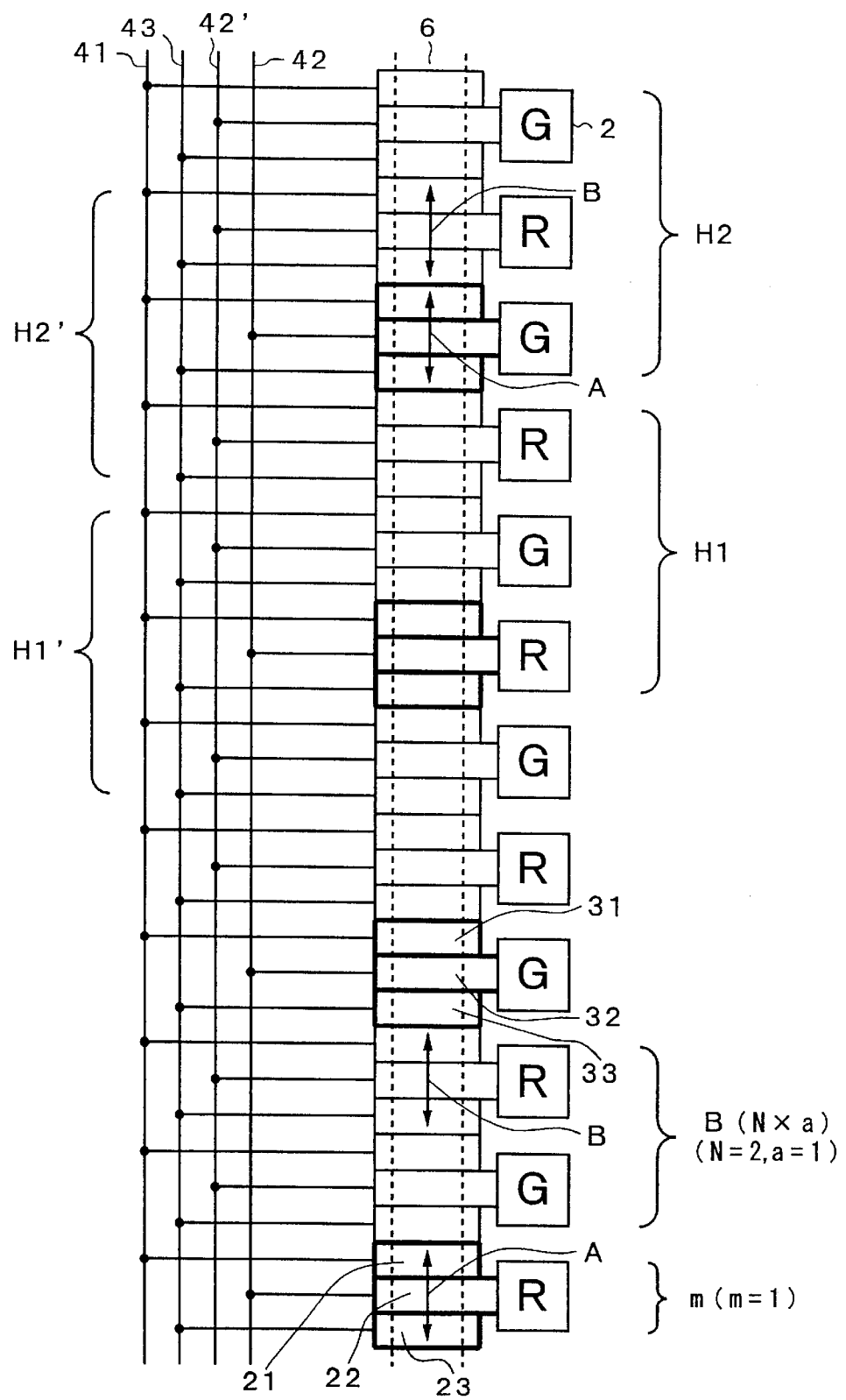
FIG. 23 is a diagram showing bus wirings of one column in the vertical direction of the image pickup device in FIG. 22.
Figure 24:
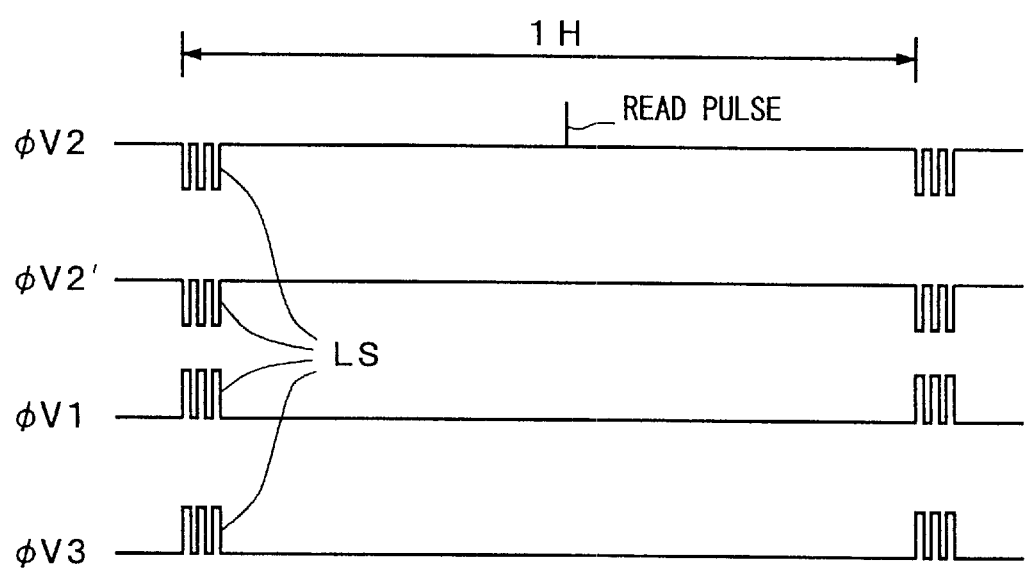
FIG. 24 is a timing chart for driving pulses of the image pickup device in FIG. 22.

FIG. 23 shows a structure of a vertical CCD of one column in the vertical direction in case of the image pickup device shown in FIG. 22. FIG. 24 shows a timing chart for driving pulses to drive the image pickup device shown in FIG. 23 in the second operating mode. Portions corresponding to those in FIG. 14 are designated by the same reference numerals and their descriptions are omitted here. In this case, in each horizontal period, the line shift pulse LS is supplied three times. In the second operating mode, the signal of only R is read out for the first horizontal period H1 and the signal of only G is read out for the second horizontal period H2. It is also possible to read out the signal of only R for a first horizontal period H1' and to read out the signal of only G for a second horizontal period H2'. In the example shown in FIG. 23, since the number of lines which are added in each horizontal period is equal, the problems such as a color deviation and the like don't occur.

Figure 25:
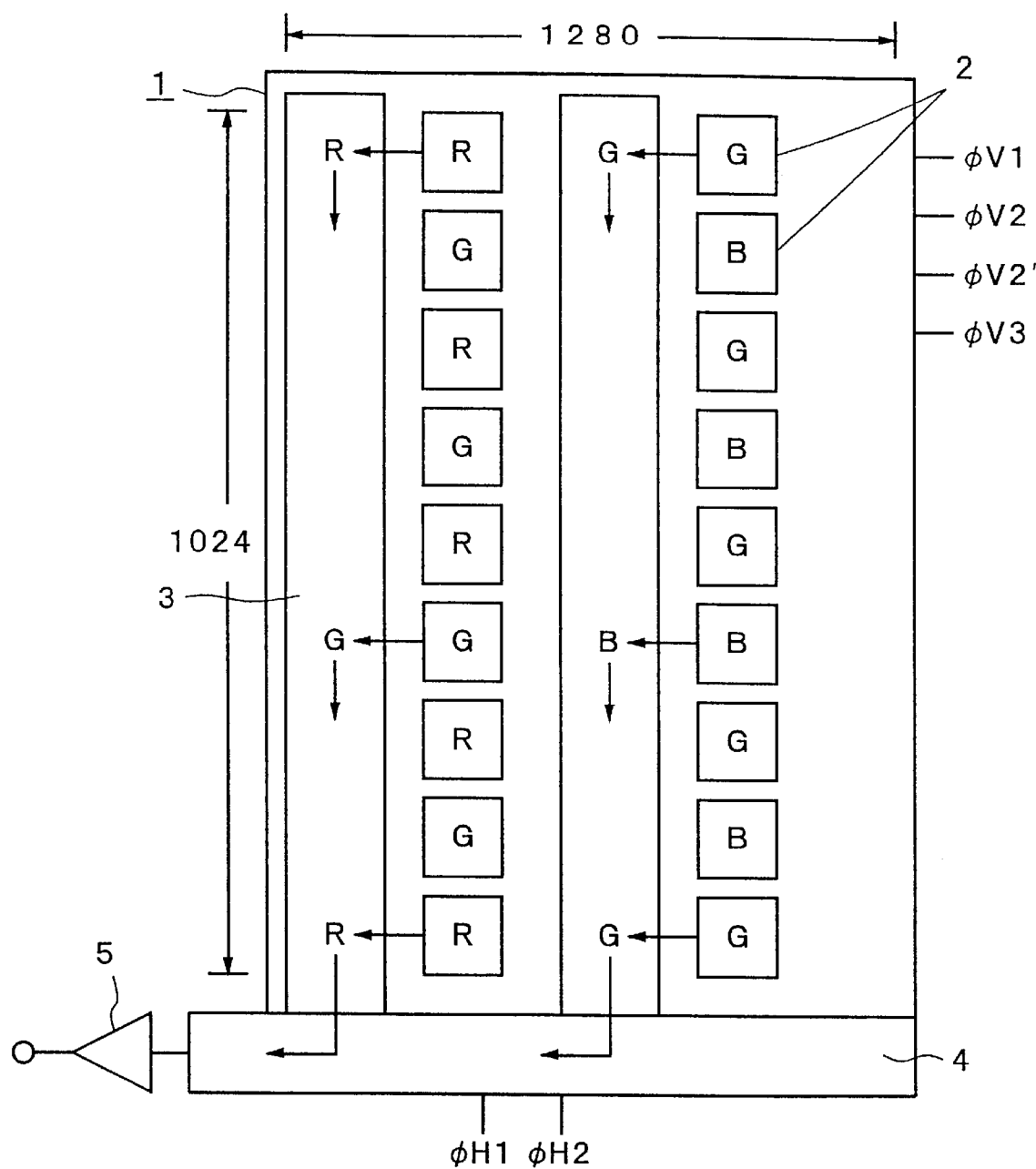
FIG. 25 is a schematic diagram showing specific further another example of an image pickup device.

As shown in FIG. 25, in an image pickup device in which the number of effective pixels is equal to (1024×1280), by setting (m=1, $a_1$=1, $a_2$=2), the number of output lines can be set to 256. $a_1$ and $a_2$ are alternately used.

Figure 26:
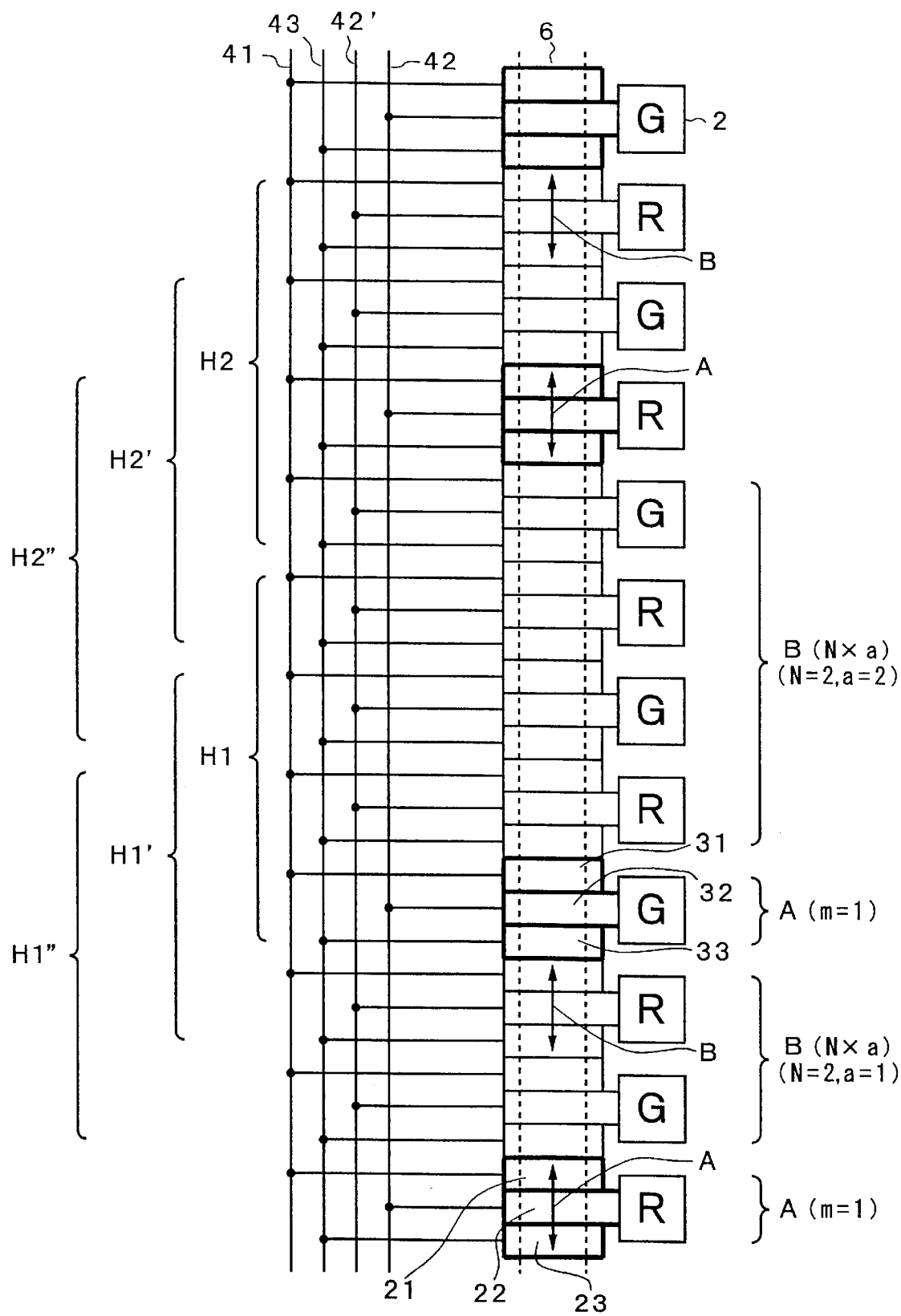
FIG. 26 is a diagram showing bus wirings of one column in the vertical direction of the image pickup device in FIG. 25.
Figure 27:
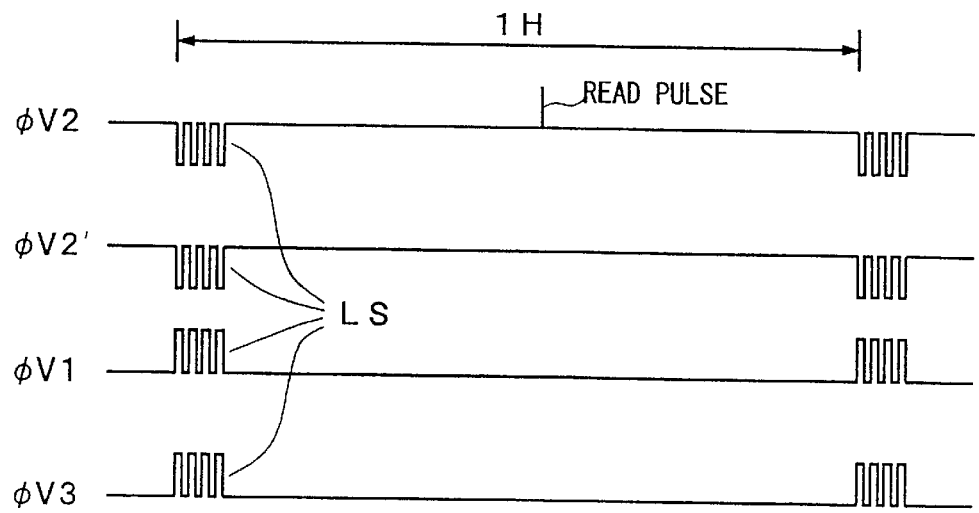
FIG. 27 is a timing chart for driving pulses of the image pickup device in FIG. 25.
Figure 28:
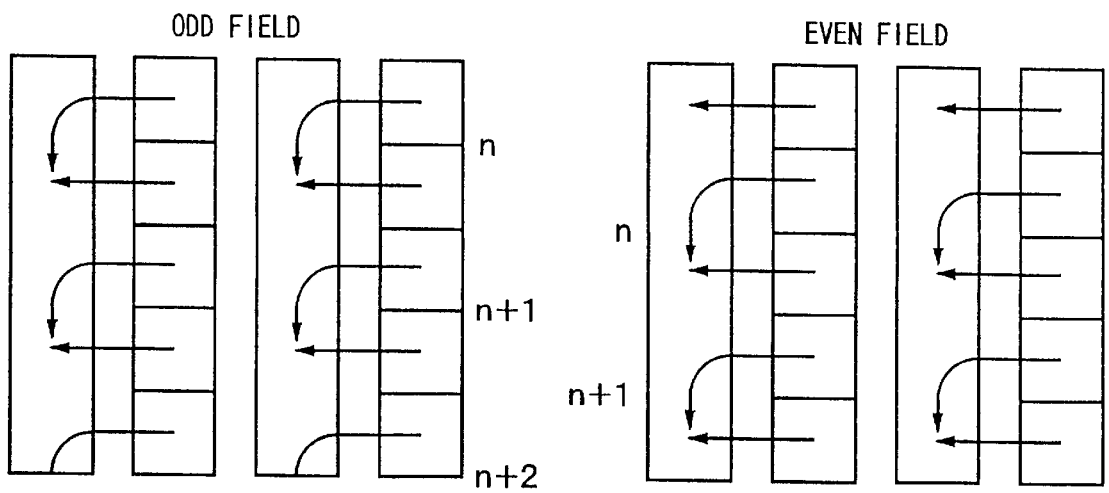
FIG. 28 is a schematic diagram for use in explanation of a conventional image pickup device.
Figure 29:
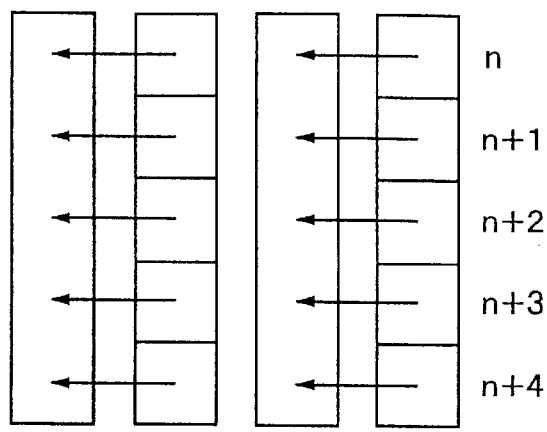
FIG. 29 is a schematic diagram for use in explanation of a conventional image pickup device.
Figure 30:
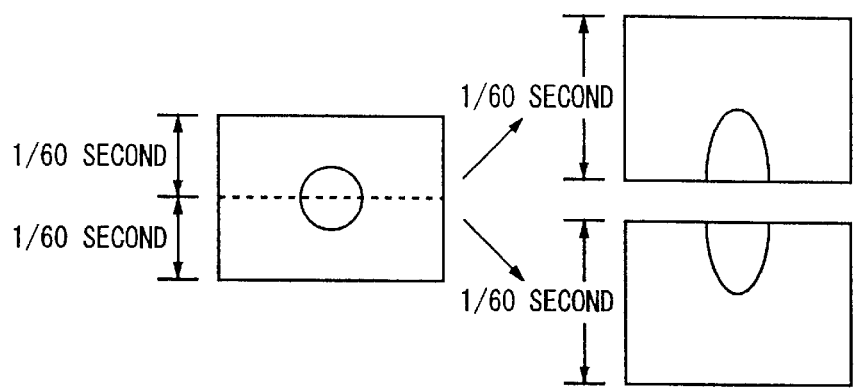
FIG. 30 is a schematic diagram showing a relation between an output of the image pickup device and a display of a liquid crystal monitor.
Figure 31:
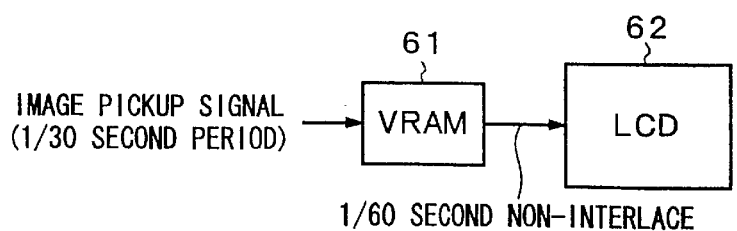
FIG. 31 is a block diagram showing a construction in case of supplying an image pickup signal generated from the image pickup device to the liquid crystal monitor.

FIG. 26 shows a structure of a vertical CCD of one column in the vertical direction of the image pickup device shown in FIG. 25. FIG. 27 shows a timing chart for driving pulses to drive the image pickup device shown in FIG. 26 in the second operating mode. Portions corresponding to those in FIG. 14 are designated by the same reference numerals and their descriptions are omitted here. In this case, the line shift pulse LS is supplied four times in each horizontal period. In the second operating mode, the signal of only R is read out for the first horizontal period H1 and the signal of only G is read out for the second horizontal period H2. It is also possible to read out the signal of only R for the first horizontal period H1' and to read out the signal of only G for the second horizontal period H2'. It is also possible to read out the signal of only R for a first horizontal period H1" and to read out the signal of only G for a second horizontal period H2". In the example shown in FIG. 26, since the number of lines which are added in each horizontal period is equal, the problems of the color deviation and the line don't occur.

In any cases shown in FIGS. 19, 22, and 25, the number of output lines can be reduced less than, for example, the number of lines (262.5) of one field of the NTSC system. Therefore, the color sequence and the angle of view can be held in the same relation as that in the full-frame reading mode and the image pickup signal in the line thinning mode can be generated in a shorter time. Thus, the image pickup picture plane can be displayed on the liquid crystal monitor without using a VRAM or frame memory.

The foregoing specific construction of the image pickup device in the embodiment has been shown as an example and the invention can also use another solid state image pickup device. For instance, the vertical CCD can also have a structure of the 2-layer electrode and 4-phase driving.

Further, as a mode to drive the solid state image pickup device, it is also possible to set a third operating mode in which the read pulse $\phi V_2'$ is applied and the read pulse $\phi V_2$ is not applied.

According to the invention as described above, a still image of a good vertical resolution can be obtained in the full-frame image pickup mode for the progressive scan and, in case of using the invention for a display of the liquid crystal display or the like, the image pickup signal can be generated at a high speed in the line thinning image pickup mode. Therefore, the image pickup signal can be displayed on the monitor without providing a VRAM. Since the image pickup signal can be generated at a high speed, a response speed of the automatic control apparatus such as an auto focus or the like can be raised. Further, since the number of frames is large, there is an advantage such that a motion of the monitor image is smoothed.

According to the invention, upon recording, since the image pickup signal is displayed in a period of time other than the period for writing the image signal into the memory (DRAM), the period of time during which the display is deleted from the display screen can be minimized. Moreover, in the reproduction, since the image pickup signal is supplied to the display device for a period of time during which the data is read out from the recording medium, the period of time during which the display is deleted can be minimized in a manner similar to the case of recording.

In addition, according to the invention, by variably setting the clock frequency, the component signal that is generated from the camera signal processing circuit can be multiplexed and a bit width of the data bus arranged for the signal processes at the post stage can be reduced. Thus, the signal deterioration due to crosstalks or the like can be suppressed.

According to the invention, the full-frame operating mode of the progressive scan and the angle of view and color sequence are held in the same relation and the image pickup signal of a small number of lines can be selectively derived and the image pickup signal can be outputted at a high speed. Therefore, even in an image pickup device of a large number of lines, the number of output lines can be reduced to a value that is equal to or less than the number of scanning lines of the television. The image pickup signal can be displayed on the monitor without using a memory of a large capacity such as frame memory, VRAM, or the like. Since the image pickup signal can be outputted at a high speed, a response speed of the automatic control apparatus such as an auto focus or the like can be raised. Further, since the number of frames is large, there is an advantage such that the motion of the monitor image is smoothed.

Although the present invention has been described with respect to preferred embodiments, the invention is not limited to the foregoing embodiments but many modifications and variations are possible within the spirit and scope of the appended claims of the invention.

What is claimed is:

1. A solid state image pickup device of an interline system, comprising:

a plurality of photosensors which are arranged in a matrix form and into which the lights transmitted through a plurality of color filters which are repeated in the vertical direction at a period of N (N is a natural number) pixels are inputted;

a vertical transfer unit for transferring charges read out from said plurality of photosensors without mixing charges from said photosensors continuously arranged in the vertical direction;

a horizontal transfer unit, coupled to said vertical transfer unit, for generating the charges transferred from said vertical transfer unit at one horizontal period;

a first signal supplying unit in which one unit is constructed by m (m is a natural number) first photosensor groups which are continuously arranged in the vertical direction and second photosensor groups of the number that is a (a is a natural number) times as large as said pixel period N which are continuously arranged in the vertical direction, said first photosensor groups and said second photosensor groups are alternately arranged in the vertical direction, and which is used for transferring the charges accumulated in said first photosensor groups to said vertical transfer unit; and a second signal supplying unit for transferring the charges accumulated in said second photosensor groups to said vertical transfer unit, wherein said first signal supplying unit and said second signal supplying unit are independently provided.

2. A device according to claim 1, further having driving signal forming means for forming driving signals which are inputted to said first and second signal supplying units and drive said vertical transfer unit and said horizontal transfer unit, and wherein said driving signal forming means forms a line shift signal as said driving signal to transfer said charges from said vertical transfer unit to said horizontal transfer unit for a horizontal blanking period.

3. A device according to claim 2, wherein said driving signal forming means can selectively switch a first operating mode to read out the charges of all pixels by supplying the driving signals to said first and second signal supplying units and a second operating mode to form the driving signal to drive only said first signal supplying unit.

4. A device according to claim 2, wherein said driving signal forming means forms said line shift signal (m+N*a) times as a whole for m continuous horizontal blanking periods so that the charges of (m+N*a) lines are generated for m horizontal periods.

5. A device according to claim 2, wherein when one pixel included in a certain first photosensor group is considered as a first pixel, said driving signal forming means forms the line shift signal in a manner such that the charges of a second pixel which is included in said certain first photosensor group and is adjacent to said first pixel in an upper or lower direction and the charges of said first pixel are transferred from said vertical transfer unit to said horizontal transfer unit for different horizontal blanking periods, respectively.

6. A device according to claim 5, wherein when a pixel which is included in said certain first photosensor group and is adjacent to said first pixel in the upper direction is set to said second pixel and a pixel which is adjacent to said first pixel in the lower direction is set to a third pixel, between said second and third pixels, with respect to the pixel in which a physical distance from said first pixel is longer, in a manner such that the charges of said pixel of the longer physical distance and the pixels locating between said pixel and said first pixel are added to the charges of said first pixel or said pixel of said longer physical distance, said driving signal forming means forms at least two line shift signals for a horizontal blanking period during which the charges of said pixel of the longer physical distance are transferred from said vertical transfer unit to said horizontal transfer unit.

7. A device according to claim 2, wherein said driving signal forming means forms the same number of line shift signals for each horizontal period.

8. A device according to claim 1, wherein said N differs on each unit basis.

9. A device according to claim 1, wherein said N is equal to a 2-unit period and is set in accordance with the order of 2 and 4 every unit.

10. A device according to claim 1, wherein said N is fixed to 2 in any unit.

11. A device according to claim 2, wherein when m=1 or 2, said driving signal forming means forms line shift signals for each horizontal blanking period, so that the charges of the pixels of one line including the signal charges and the charges of the pixels of (N*a/m) lines which don't include the signal charges are mixed in said horizontal transfer unit.

* * * * *